(12) United States Patent
Nakamura et al.

(10) Patent No.: US 7,761,542 B2
(45) Date of Patent: Jul. 20, 2010

(54) NETWORK ACCESS CONTROL METHOD, NETWORK SYSTEM USING THE METHOD AND APPARATUSES CONFIGURING THE SYSTEM

(75) Inventors: Katsuichi Nakamura, Fukuoka (JP); Shinya Yamamura, Fukuoka (JP); Yoshiharu Sato, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1684 days.

(21) Appl. No.: 09/817,303

(22) Filed: Mar. 26, 2001

(65) Prior Publication Data

US 2002/0053029 A1  May 2, 2002

(30) Foreign Application Priority Data

Oct. 30, 2000  (JP)  ............................. 2000-331345

(51) Int. Cl.
*G06F 15/173* (2006.01)
(52) U.S. Cl. ........................ 709/223; 709/224; 709/225; 705/16
(58) Field of Classification Search ................. 709/225, 709/223, 224; 705/16
See application file for complete search history.

(56) References Cited

U.S. PATENT DOCUMENTS 5,941,947 A * 8/1999 Brown et al. ................. 709/225

2002/0188720 A1 * 12/2002 Terrell et al. ................. 709/225

FOREIGN PATENT DOCUMENTS

| EP | 0393293 A1 | 10/1990 |
| JP | 5-316115 | 11/1993 |
| JP | 6-152615 | 5/1994 |
| JP | 7-16200 | 2/1995 |

* cited by examiner

*Primary Examiner*—Vivek Srivastava
*Assistant Examiner*—Adnan M Mirza
(74) *Attorney, Agent, or Firm*—Katten Muchin Rosenman LLP

(57) ABSTRACT

A network access control method for a network system comprising network apparatuses having a packet filtering function, a service server connected with an IP network via the network apparatus, providing a service to a user, a user terminal connected with the IP network via the network apparatus, for the user to utilize the service provided by the service server, a reception server connected with the IP network via the network apparatus, receiving an access from the user for the service server, and an access control server controlling the network apparatuses. The method comprising the steps of a) the reception server receiving access request information from the user terminal, and holding it, and b) the access controlling server performing traffic control such as to extract, based on processing capability of the service server and a traffic amount for the service server, such an amount of the access request information as that the service server can optimally deal with, so as to allow the access for the service server.

10 Claims, 35 Drawing Sheets

FIG. 11

USER PROFILE

| TRANSMISSION SOURCE IP ADDRESS |
| --- |
| DESTINATION IP ADDRESS |
| DESTINATION PORT NUMBER |
| USER CLASS |
| ⋮ |
| DESTINATION IP ADDRESS |
| DESTINATION PORT NUMBER |
| USER CLASS |

USER CLASS :
  1 → HIGH PRIORITY
  2 → MEDIUM PRIORITY
  3 → LOW PRIORITY
  0 → UNALLOWED

FIG. 16

| ACCESS REQUEST INFORMATION |
|---|
| REQUEST TYPE |
| TRANSMISSION SOURCE IP ADDRESS |
| DESTINATION IP ADDRESS |
| DESTINATION PORT NUMBER |

REQUEST TYPE :
    ACCESS REQUEST → 0
    WAITING RESPONSE REQUEST → 1
    WAITING DENIAL REQUEST → 2

FILTERING REQUEST TYPE :

0 : ALLOWANCE REQUEST
    1 : UNALLOWANCE REQUEST
    2 : PRIORITY CONTROL ALLOWANCE REQUEST
    3 : (ALLOWANCE) CANCELLATION REQUEST

FIG. 37

EFFECTIVE TIMER
SETTING REQUEST

| REQUEST TYPE |
| --- |
| DIFFERENCE BETWEEN MAXIMUM PERMISSIBLE ACCESS NUMBER AND NUMBER OF USERS ON CONNECTION |
| ⋮ |
| DIFFERENCE BETWEEN MAXIMUM PERMISSIBLE ACCESS NUMBER AND NUMBER OF USERS ON CONNECTION |
| DESTINATION IP ADDRESS |
| DESTINATION PORT ADDRESS |

REQUEST TYPE :
    PRIORITY CONTROL ' ON ' → 0
    PRIORITY CONTROL ' OFF ' → 1

DIFFERENCE BETWEEN MAXIMUM PERMISSIBLE
ACCESS NUMBER AND NUMBER OF USERS ON CONNECTION :
    • SINGLE DATA IS SET WHEN PRIORITY CONTROL ' OFF '
    • DATA IS SET FOR EACH CLASS WHEN PRIORITY CONTROL ' ON '

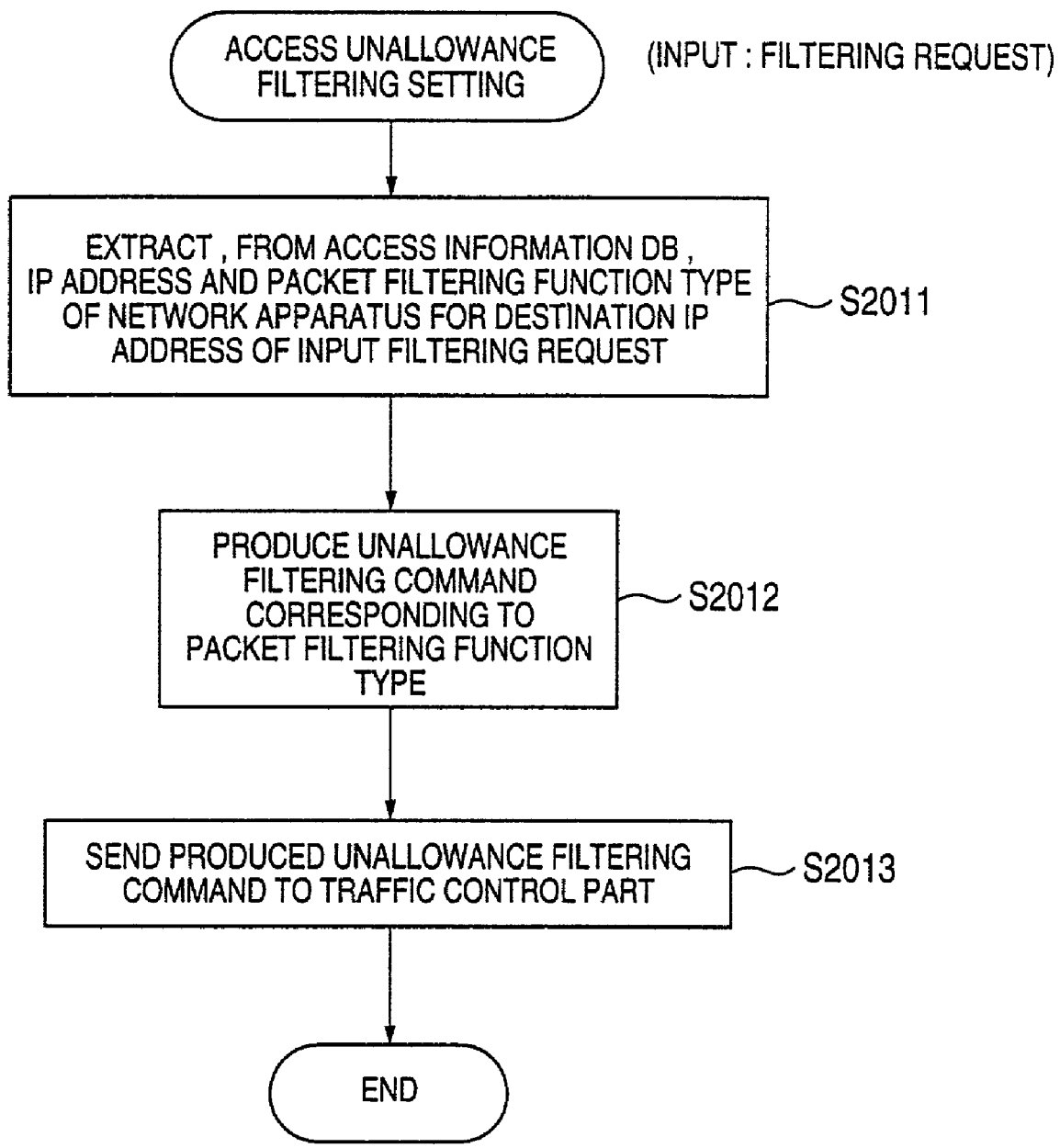

NETWORK ACCESS CONTROL METHOD, NETWORK SYSTEM USING THE METHOD AND APPARATUSES CONFIGURING THE SYSTEM

BACKGROUND OF THE INVENTION

1. Field of the Invention

The present invention relates to a network access control method, a network system using the method, and apparatuses configuring the system, and, in particular, to a network access control method for an IP network, a network system using the method, and apparatuses configuring the system for an IP network 2. Description of the Related Art As a network access control method in the related art, there is an access control method employing a proxy server. The proxy server is software or a server machine for repeating accesses to various services of Internet such as multimedia database, WWW (World Wide Web) and so forth.

The proxy server is used as a cache function in a case where traffic is to be reduced between a network in a company and the Internet. For example, when a user in the company accesses a page of WWW, the contents obtained therefrom is stored by the proxy server for a predetermined period. Then, when another user accesses the same page, it is not necessary to access the information through the Internet, and the information stored by the proxy server is transferred to this other user. Thereby, it is possible to reduce the frequency of access operations to the Internet.

Further, there is another access control method of previously setting the number of connections by a server application. For example, Japanese Laid-Open Patent Application No. 5-316115 discloses such a method. In this method, a plurality of computer networks each connecting a plurality of computers are mutually connected, and, through access control made by using information of date, day of the week, time, and/or group number, load distribution for a private line will be performed precisely and efficiently. In the method, for this purpose, a previously set information table (including date, day of the week, time, group number, and so forth) is referred to, and thereby, access control for the networks is performed.

Further, as disclosed in Japanese Laid-Open Patent Application No. 6-152615, there is a network access control method for the purpose of performing efficient uniform load control. In the method, a function of measuring a load of a transmission path and a function of switching a transmission path are provided, and, thereby, a load (traffic) of each transmission path is measured and a transmission path having a low load is selected.

Further, a load balancing system has been also proposed. In this system, for the purpose of distributing a load of a server to which traffic is concentrated, a plurality of mirror servers are provided, load situations of the servers and mirror servers are measured, and the mirror series are caused to access the server which has a lowest load.

In the above-mentioned method employing the proxy server, in a case where an object of an information transmitting source is updated after a content object is once stored in a cache, the object is not updated because the substance of the object is not accessed for the subsequent access operations. Accordingly, no new information can be obtained every time an access request is made. Further, a dynamic object (using Common Gateway Interface, Server Side Include, Active Server Pages, and so forth) which varies in contents each time access is made as a result of search by a search engine cannot be re-used. Further, the cache function has a limitation of a memory capacity, disk capacity, available term of cached information, or the like. Accordingly, in some case, even an object which is regarded as effective should be erased when a situation in the capacity is serious and confusing.

In the above-mentioned method of previously setting the number of connections, the user should access many times when a traffic is concentrated. Accordingly, a useless traffic flows through a network. Further, depending on the previously set information (date, day of the week, time), or even in a case where a traffic is measured, and a path having a low load is selected, path selection may not result in a sufficient effect unless a server to which a connection is made has a sufficient processing capability.

In the above-mentioned method of measuring load situations of servers and mirror servers, and causing the server having a low load to be accessed, because this method merely distributes accesses from users, access control is not performed in a case of a heavy load applied to each server or each mirror server. For the server to which traffic is concentrated, merely the number of mirror servers is increased uselessly unless access regulation is made by the end of the network.

SUMMARY OF THE INVENTION

An object of the present invention is to provide a network access control method, a network system using the method and apparatuses configuring the system, by which, dynamic objects can be re-used, reduction of traffic can be achieved, reduction of load borne by a user can be achieved, and a user who has requested an access can receive a service conveniently at a quick response speed as the own access turn has come.

A network access control method according to the present invention for a network system comprising:

network apparatuses having packet filtering functions;

a service server connected with an IP network via the network apparatus and providing a service to a user;

a user terminal connected with the IP network via the network apparatus, for the user to utilize therethrough the service provided by the service server;

a reception server connected with the IP network via the network apparatus and receiving an access from the user for the service server; and an access control server controlling the network apparatuses, comprises the steps of:

a) the reception server receiving access request information from the user terminal and holding it; and b) the access controlling server performing traffic control such as to extract, based on a processing capability of the service server and a traffic amount for the service server, such an amount of the access request information as that which the service server can optimally deal with, so as to allow the access for the service server.

Thereby, when the users access the service server, an amount of the accesses from the users corresponding to the processing capability of the service server and traffic condition for the service server are allowed. Accordingly, the dynamic objects can be re-used, and, also, the traffic can be reduced.

A network system according to the present invention comprises:

network apparatuses having packet filtering functions;

a service server connected with an IP network via-the network apparatus and providing a service to a user;

a user terminal connected with the IP network via the network apparatus, for the user to utilize therethrough the service provided by the service server;

a reception server connected with the IP network via the network apparatus and receiving an access from the user for the service server; and an access control server controlling the network apparatuses, and wherein:

the reception server has an access registering part which receives access request information from the user terminal and holds it; and the access controlling server has a filtering optimizing part which performs traffic control such as to extract, based on a processing capability of the service server and a traffic amount for the service server, such an amount of the access request information held by the access registering part as that which the service server can optimally deal with, so as to allow the access for the service server.

Thereby, when the users access the service server, an amount of the accesses from the users corresponding to the processing capability of the service server and traffic condition for the service server are allowed. Accordingly, the dynamic objects can be re-used, and, also, the traffic can be reduced.

A reception server according to the present invention comprises:

an access list holding access request information from a user terminal;

a user profile holding user information including a user class for each user;

an access receiving part receiving an access from the user terminal;

an access registering part registering access request information received via the access receiving part into the access list in order of the reception;

a user class extracting part extracting an IP address from the received access request information and identifying the user by using the extracted IP address so as to extract the user class from the user profile; and a by-user-class registering part registering the access request information received via the access receiving part into the access list based on the user class extracted through the user class extracting part.

Thereby, it is possible to register the access request information from the users by user class.

The reception server may further comprise:

an estimated waiting time calculating part calculating an expected waiting time, from the number of the users waiting, according to a position of the access list at which the access request received from the user terminal is registered; and an access information reporting part reporting the calculated estimated waiting time to the user, and reporting to the user that the access can be performed after the expected waiting time has elapsed.

Thereby, the estimated time required until the access to the service server comes to be enabled is reported to the user so that the user can wait for the access to the service server, and thus, a load borne by the user can be reduced.

The reception server may further comprise:

an access confirming part determining whether or not the access request is to be registered in the access list, when waiting is needed, after receiving the access request from the user; and a waiting confirmation inquiring part inquiring to the user for the access confirming part to make the determination.

Thereby, it is possible to confirm to the user as to whether or not the user will wait for the access.

An access control server according to the present invention comprises:

a access information database holding information concerning a processing capability of a service server and a maximum permissible access number calculated based on the processing capability of the service server;

a traffic control part controlling a network apparatus;

a static permissible access number calculating part calculating the maximum permissible access number based on the information concerning the processing capability of the service server; and a filtering optimizing part reading such an amount of access request information from an access list holding the access request information from user terminals in a reception server, from the top, as that for the maximum permissible access number, producing packet filtering setting information for the users making access requests to be able to access to a service server, and setting the produced information into the network apparatus via the traffic control part.

Thereby, control can be made such that such a number of accesses as those corresponding to the processing capability of the service server are accepted.

The access control server may further comprise:

a load and traffic monitoring part monitoring a load condition of the service server and a traffic condition of a network apparatus holding the service server; and a dynamic permissible access number calculating part periodically performing communication with the load and traffic monitoring part so as to extract therefrom information of the load condition and traffic condition and calculate the maximum permissible access number therefrom, and, also, registering the calculated maximum permissible access number in the access information database.

Thereby, such a control can be made as that in which such a number of accesses to the service server by the users as those for which the service server can operate optimally are allowed, according to the load condition and traffic condition of the service server.

The access control server may further comprise:

a control information database holding control information which is used as a guideline for reading the access request information from the access list; and a by-user-class access request reading part reading the access request information from the access list for each user class based on the control information extracted from the control information database, when the filtering optimizing part reads such an amount of the access request information from the access list as that for the maximum permissible access number, in a case where the access request information is registered in the access list by user class.

Thereby, the number of sets of access request information which are read from the access list can be made variable, according to user class.

The access control server may further comprise:

an effective timer setting part setting an effective timer for the access request information when the packet filtering setting information is produced; and a filtering canceling part canceling the packet filtering control set in the network apparatus, when the effective timer has expired.

Thereby, the time used for each access is managed by using the effective timer, and, access allowance is cancelled appropriately.

A service server according to the present invention connected with an IP network via a network apparatus, comprises:

a session finish determining part determining that a session performed with a user terminal has finished; and a session finish reporting part reporting to an access control server that the session performed with the user terminal has finished.

Thereby, access allowance is canceled for the access for which the session has been finished.

The reception server may further comprise a user authenticating part determining, based on the user class extracted by the user class extracting part, whether or not the received access request is given from an unallowed user, and, reporting, when the access request is given from the unallowed user, this matter to the access control server.

Further, the access control server may further comprise an access unallowance filtering setting part producing, based on the report from the user authenticating part of the reception server, the packet filtering setting information of unallowance of access for the service server, and setting the produced information to the network apparatus.

Thereby, a control can be made such as that in which only when the user has an access right, the access to the server is allowed.

Other objects and further features of the present invention will become more apparent from the following detailed description when read in conjunction with the accompanying drawings.

BRIEF DESCRIPTION OF THE DRAWINGS

FIG. 11 shows a data configuration of a user profile shown in FIG. 1;

FIG. 16 shows a message structure of access request information;

FIG. 37 shows a message structure of an effective timer setting request;

FIG. 39 shows a flow chart of processing performed by an-access-unallowance filtering setting part shown in FIG. 1.

DETAILED DESCRIPTION OF THE PREFERRED EMBODIMENTS

Figure 1:
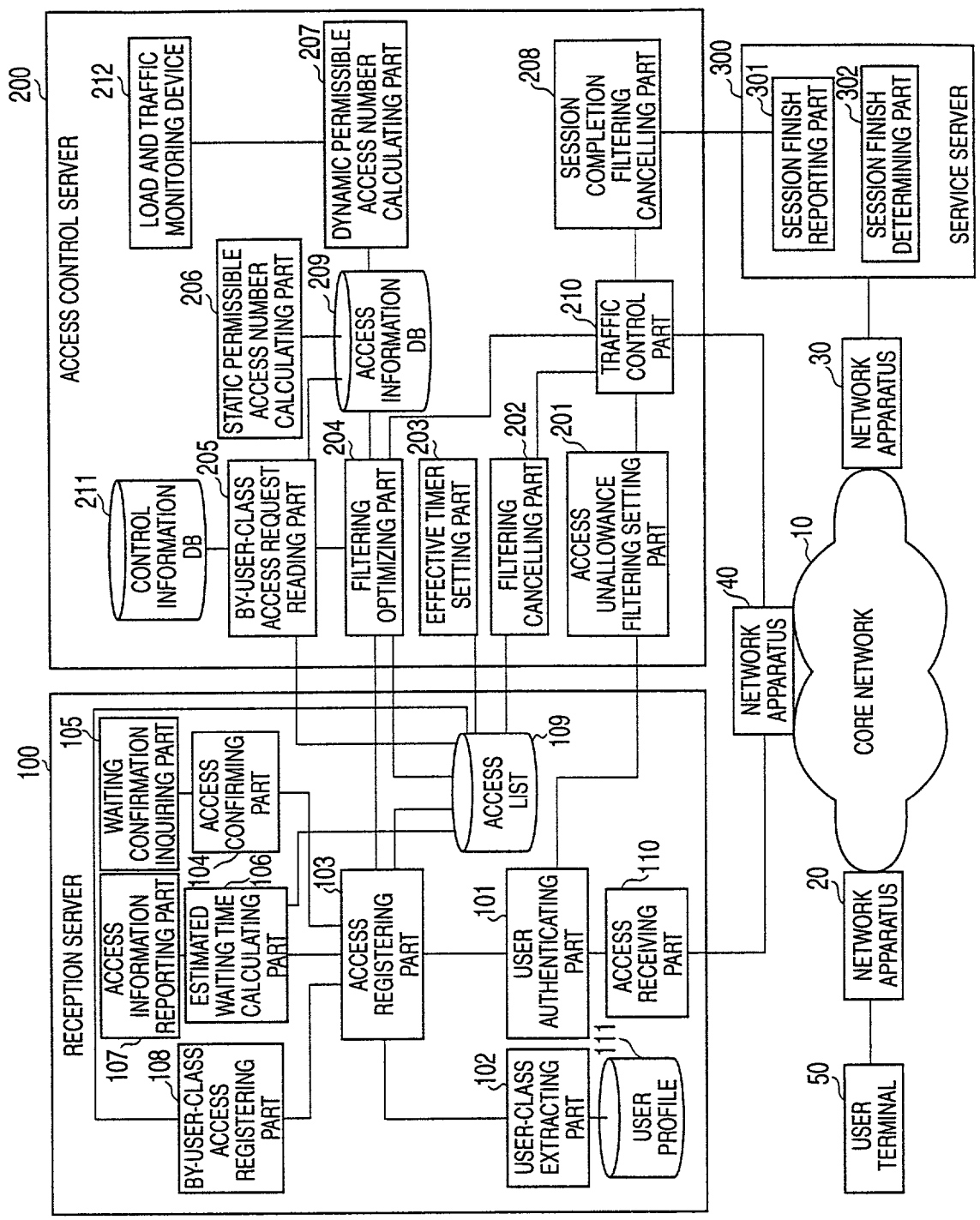
FIG. 1 shows an entire configuration of an embodiment of the present invention.

FIG. 1 shows an entire configuration of one embodiment of the present invention. In FIG. 1, a core network (IP network) 10 includes network apparatuses 20, 30 and 40 such as routers and so forth. The network apparatuses 20 and 30 have packet filtering functions, a user terminal 50 is connected to the network apparatus 20, and a service server 300 providing services to users is connected to the network apparatus 30.

A reception server 100, as a reception for the service server 300, which receives an access from a user, and, an access control server 200 which controls the network apparatus 40 and also monitors a load condition of the service server 300 and a traffic condition of the network apparatus 30 holding the service server 300, are connected to the network apparatus 40.

In the reception server 100, a user profile 111 holds user information such as user classes and so forth of respective users. An access list 109 holds access request information given from users. An access receiving part 110 receives an access from a user. An access registering part 103 receives access request information from a user via the access receiving part 110, and registers the access request information in order of the reception.

A user-class extracting part 102 receives the access request information from a user via the access receiving part 103, extracts an IP address from the access request information, identifies the user by the IP address, and extracts a user class thereof from the user profile 111. A by-user-class access registering part 108, based on the user class obtained by the user-class extracting part 102, registers the access request information to the access list 109. An estimated waiting time calculating part 106, when receiving the access request from the user, calculates an estimated waiting time from a position of the access list 109 at which this access request is registered, by using a conventional AI function, statistical technique or the like. An access information reporting part 107 reports information of the thus-calculated estimated waiting time to the user, and, reports the user that access can be made after the estimated waiting time has elapsed.

An access confirming part 104, when receiving the access request from the user, determines whether or not the access request is registered to the access list 109. A waiting confirmation inquiring part 105 inquires the user whether or not the access request is registered to the access list 109. A user authenticating part 101 determines, based on the user class obtained via the user-class extracting part 102, whether or not the access request is given from an unallowed user, and, when it is given from an unallowed user, reports this matter to the access control server 200.

In the access control server 200, an access information DB (database) 209 holds information concerning a processing capability of the service server 300 and a maximum permissible access number calculated from the processing capability of the service server. A control information DB 211 holds control information which is used as a guideline for reading the access request information from the access list 109. A traffic control part 210 controls the network apparatus 40. A load and traffic monitoring device 212 monitors a load condition of the service server 300 and a traffic condition of the network apparatus 30 holding the service server 300.

A static permissible access number calculating part 206 calculates the maximum permissible access number based on the processing capability of the service server 300. A filtering optimizing part 204 reads such an amount of the access request information as that for the maximum permissible access number from the top, generates packet filtering setting information enabling the user terminal which made the access request to access the service server 300, and sets this packet filtering setting information to the network apparatuses 20 and 30 via the traffic control part 210. A dynamic permissible access number calculating part 207 performs communication with the load and traffic monitoring device 212, extracts therefrom the load condition and traffic condition, and calculates the maximum permissible access number for the access information DB 209, and, also, registers the calculated maximum permissible access number to the access information DB 209.

A by-user-class access request reading part 205 extracts the control information used as the guideline for reading from the control information DB 211, when the filtering optimizing part 204 reads such an amount of the access request information as that for the maximum permissible access number from the access list 109, in a case where the access request information is registered in the access list 109 by user class, and, based on the thus-read control information, reads the access request information therefrom for each user class. An effective timer setting part 203, when the packet filtering setting information is generated, sets an effective timer to the access request information.

A filtering canceling part 202 cancels the packet filtering control set to the network apparatus when the effective timer has expired. A session completion filtering canceling part 208 cancels the packet filtering control set to the network apparatus, after receiving the information indicating that session has been completed from the service server, when the service server 300 provides a service to the user, in order to prevent access from the user from being unallowed during the session. The an access unallowance filtering setting part 201 generates packet filtering setting information disabling access to the service server 300, and sets this information to the network apparatuses 20 and 30.

In the service server 300, a session finish determining part 302 determines that the session performed with the user has been finished. A session finish reporting part 301 reports the access control server 200 that the session performed with the user has been finished, when the service server provides a service to the user, in order to prevent an access from the user from being unallowed during the session.

Figure 2:
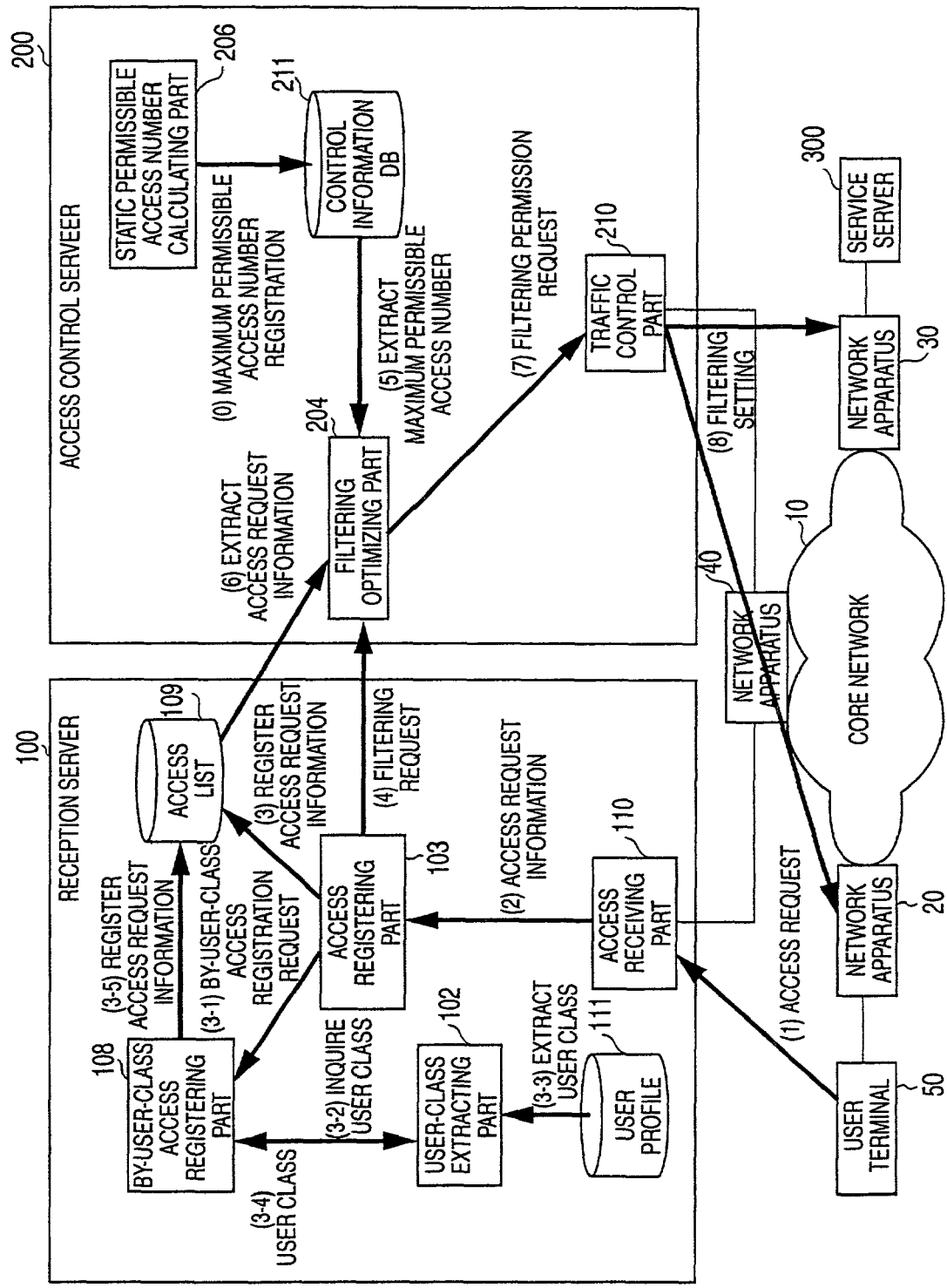
FIG. 2 illustrates a packet filtering function of a method according to the present invention.

With regard to the packet filtering function of the method according to the present invention, description will now be made with reference to FIG. 2 excerpted from FIG. 1. In FIGS. 2 through 9, numbers enclosed by brackets attached to arrows correspond to numbers enclosed by brackets in the following description.

In FIG. 2, the user transmits the access request for the service server 300 via the user terminal 50 (1). The access receiving part 110 of the service server 300 receives the access request information, and transfers it to the access registering part 103 (2). The access registering part 103 registers the access request information to the access list 109 in order of the reception (3). Then, a filtering request is given to the filtering optimizing part 204 of the access control server 200 (4).

Then, the filtering optimizing part 204 of the access control server 200 receives the filtering request from the access registering part 103 of the reception server 100, extracts from the access information DB 211 (5) the maximum permissible access number calculated by the static permissible access number calculating part 206 based on the processing capability of the service server 300 of the access destination (0), and reads such an amount of the access information as that for the maximum permissible access number from the access list (6). Then, the packet filtering allowance information allowing access to the service server 100 by the user terminal 50 which gave the access request is produced, and the packet filtering allowance request is sent to the traffic control part 210 (7). The traffic control part 210 controls the network apparatuses 20 and 30 based on the thus-given information.

In the above description, the access registering part 103 registrars the access request information to the access list 109 in order of the reception. However, when by-user-class access registration should be made, a by-user-class access registration request is given to the by-user-class access registering part 108 (3-1). The by-user-class access registering part 108 inquires the user-class extracting part for the user class (3-2).

The user-class extracting part 102 extracts the IP address from the above-mentioned access request information, identifies the user by using the IP address, extracts the user class from the user profile 111 (3-3), and returns the extracted user class to the by-user-class access registering part 108 (3-4). Then, the by-user-class access registering part 108 registers the access request information to the access list 109 based on the thus-obtained user class (3-5).

An estimated waiting time reporting function of the method according to the present invention will now be described with reference to FIG. 3 excerpted from FIG. 1.

Figure 3:
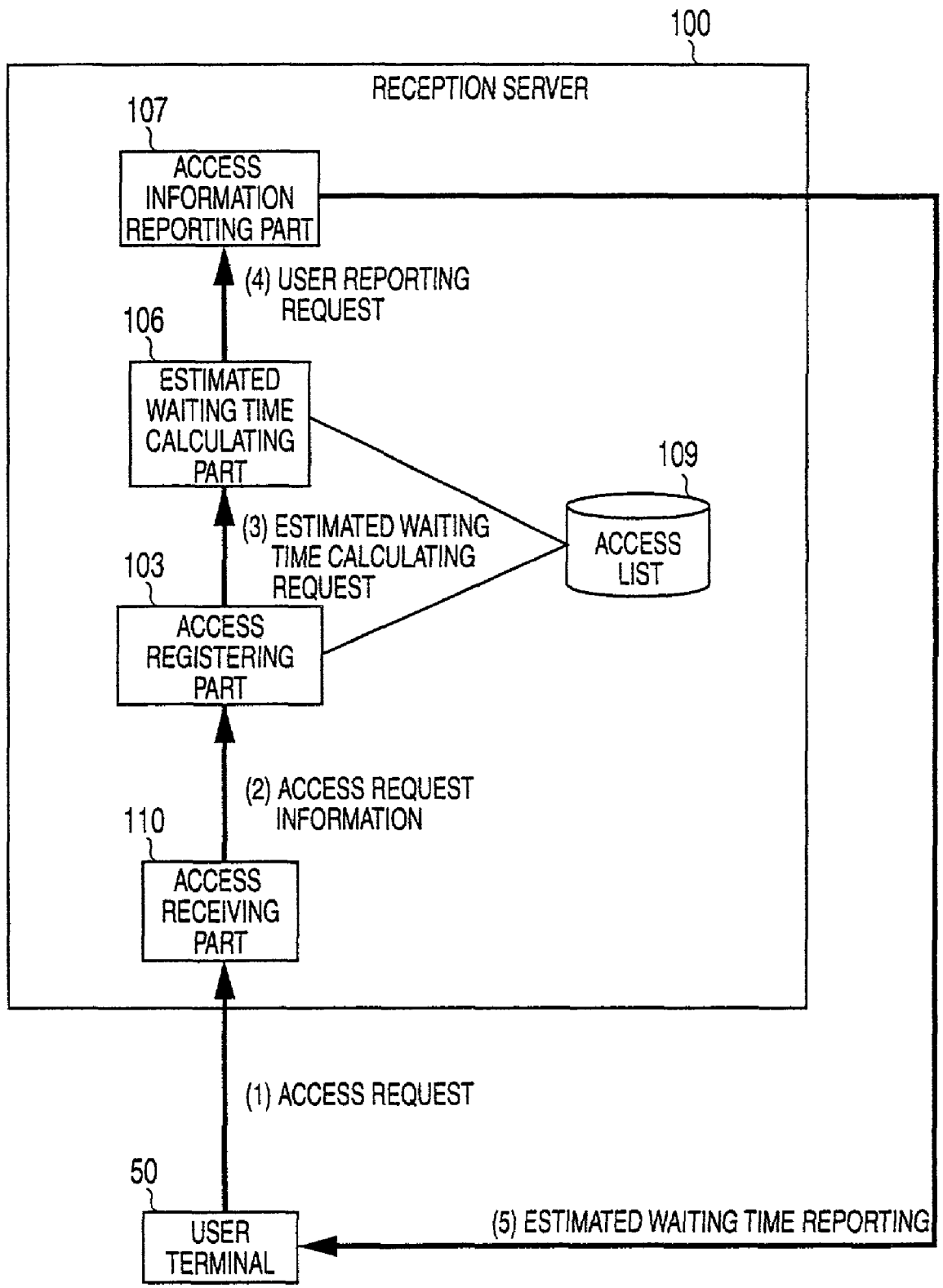
FIG. 3 illustrates an estimated waiting time reporting function of the method according to the present invention.

In FIG. 3, the user transmits the access request to the service server 300 via the user terminal 50 (1). The access receiving part 110 requests the access registering part 103 to register the access request to the access list (2). The access registering part 103 sends an estimated waiting time calculating request to the estimated waiting time calculating part 108 (3) in a case of overload in which no spare access list remains in the access list 109. The estimated waiting time calculating part 108 refers to the access list 109, calculates an estimated waiting time from the number of users waiting according to a registration position of the relevant access request information, and sends a user reporting request to the access information reporting part (4). The access information reporting part 107 reports the waiting time to the user terminal 50 for the user who has sent the access request (5).

An access list registration confirmation reporting function of the method according to the present invention will now be described with reference to FIG. 4 excerpted from FIG. 1.

Figure 4:
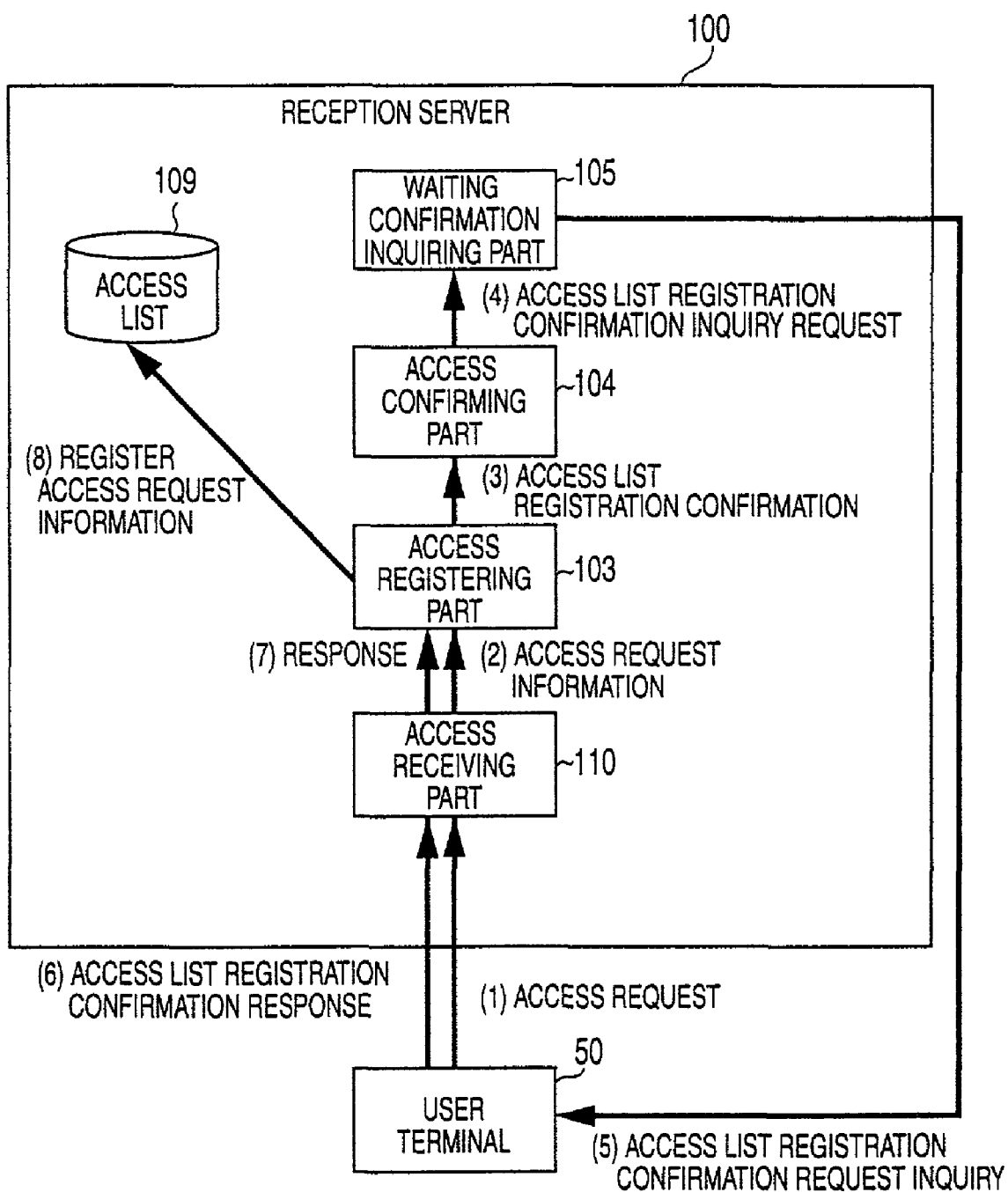
FIG. 4 illustrates an access list registration confirming function of the method according to the present invention.

In FIG. 4, the user sends the access request to the service server 300 via the user terminal 50 (1). The access receiving part 110 requests the access registering part 103 to register the access request to the access list 109. The access registering part 103 makes an inquiry for registration thereof to the access list 109 to the access confirming part 104 (3), when it is necessary to make an inquiry as to whether or not the access request information is registered to the access list 109, that is, when waiting by the user is needed. The access confirming part 104 extracts the IP address of the user terminal 50 from the access request information, and requests the waiting confirmation inquiring part 105 to perform access list registration confirmation inquiry for the extracted IP address (4). The waiting confirmation inquiring part 105 transmits a confirmation (inquiry) message to the user (5).

The user transmits a response to the confirmation (inquiry) message to the access receiving part 110 (6). The access receiving part 110 transmits the response from the user to the access registering part 103 (7), and the access registering part 103 registers the access request information to the access list 109 when the response indicates the registration (8).

A dynamic permissible access number calculating function of the method according to the present invention will now be described with reference to FIG. 5 excerpted from FIG. 1.

Figure 5:
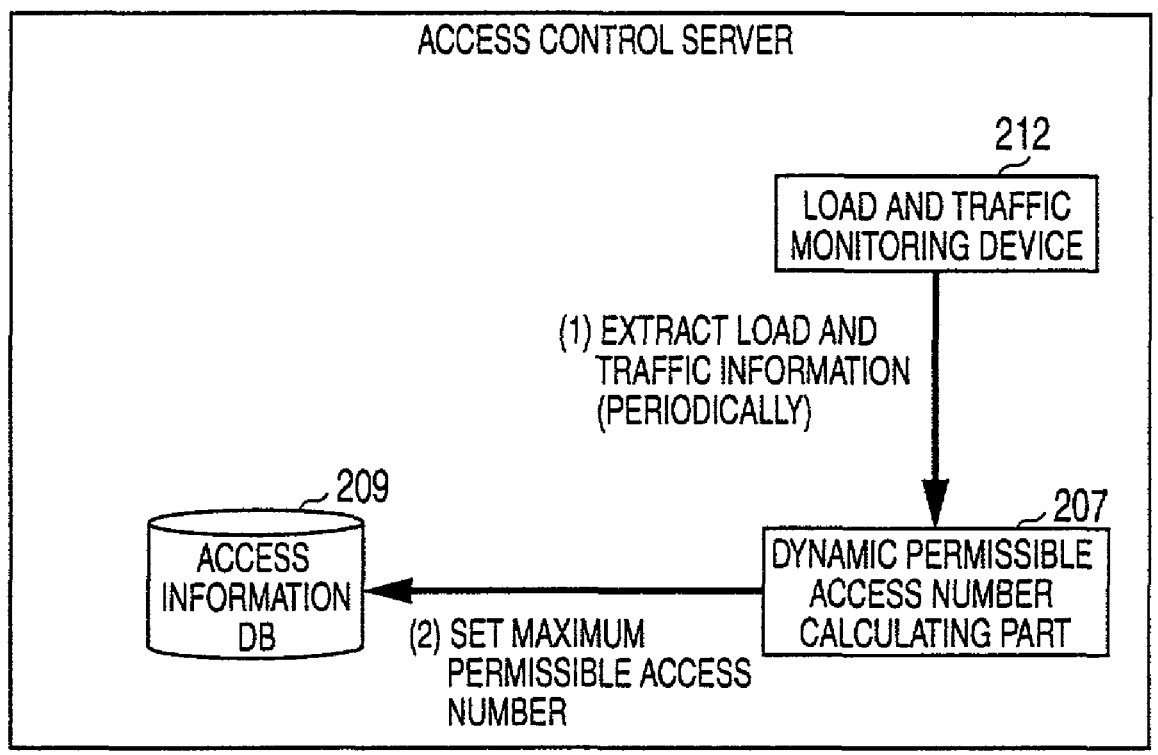
FIG. 5 illustrates a dynamic permissible access number calculating function of the method according to the present invention.

In FIG. 5, the dynamic permissible access number calculating part 207 extracts, periodically, the load condition of the service server 300 and the traffic condition of the network apparatus 30 which holds the service server 300, from the load and traffic monitoring device 212, and calculates the maximum permissible access number (1). Then, the thus-calculated maximum permissible access number is set to the access information DB (2).

A by-user-class access request reading function of the method according to the present invention will now be described with reference to FIG. 6 excerpted from FIG. 1.

Figure 6:
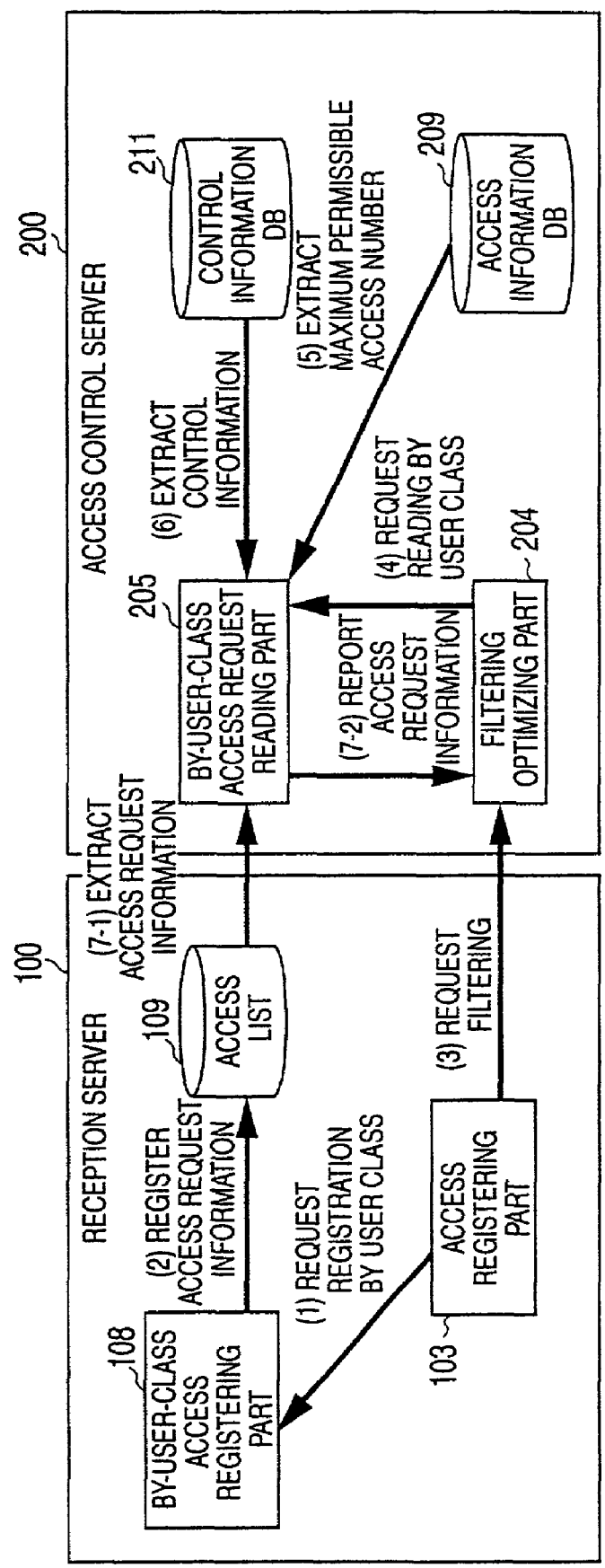
FIG. 6 illustrates a by-user-class access request reading function in the method according to the present invention.

In FIG. 6, when the access request information is to be registered to the access list 109 by user class, the access registering part 103 sends a request for registering the access request information by user class, to the by-user-class access registering part 108 (1). The by-user-class access registering part 108 registers the access request information by user class to the access list 109 (2). Then, the access registering part 103 sends a filtering request to the filtering optimizing part 204 (3).

When receiving the filtering request, the filtering optimizing part 204 inquires the by-user-class access request reading part 205 a ratio at which the access request information is read by user class (4) from the access list 109. The by-user-class access request reading part 205 extracts the maximum permissible access number from the access information DB (5), extracts the control information as to at which ratio the access request information is read by user class, from the control information DB (6), and, based on the extracted information, extracts the access request information from the access list 109 by user class (7-1), and sends it to the filtering optimizing part (7-2).

An effective timer function of the method according to the present invention will now be described with reference to FIG. 7 excerpted from FIG. 1.

Figure 7:
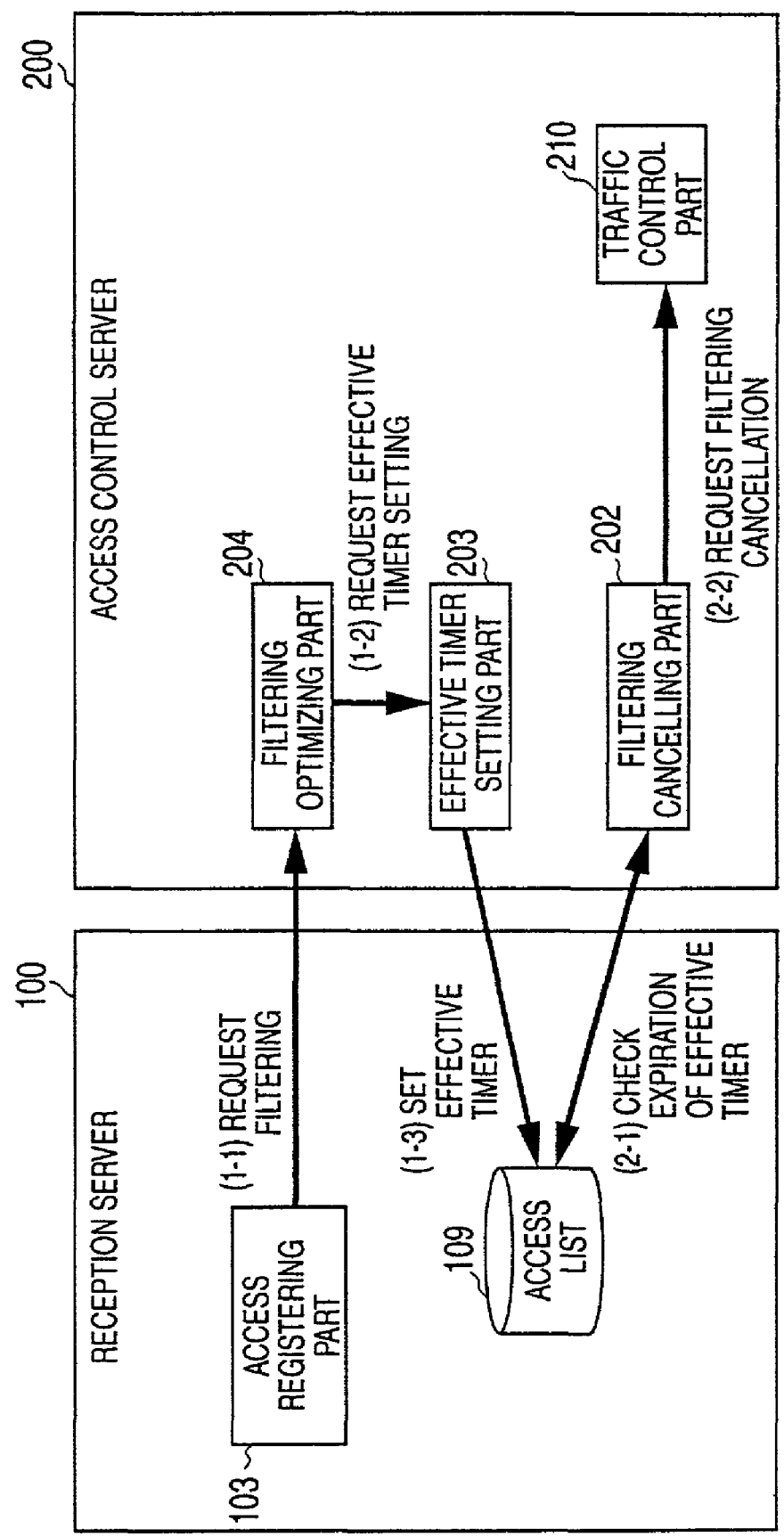
FIG. 7 illustrates an effective timer function in the method according to the present invention.

In FIG. 7, when the filtering optimizing part 204 receives the filtering request from the access registering part 103 of the reception server 100 (1-1), the filtering optimizing part 204 sends an effective timer setting request to the effective timer setting part 203 after setting the packet filtering to the network apparatuses 20 and 30 (1-2). The effective timer setting part 203 sets an effective timer value to the access request information of the access list 109 (1-3).

The filtering canceling part 202 determines periodically whether the effective timers of the access list 109 have expired (2-1). When there is the access request information for which the effective timer has expired, this access request information is removed from the access list 109, the packet filtering canceling information making the user terminal 50 via which the relevant access request has been made become access-unallowed from access-allowed for the service server 300, and sends a filtering canceling request to the traffic control part 210 (2-2).

A session finish function of the method according to the present invention will now be described with reference to FIG. 8 excerpted from FIG. 1.

Figure 8:
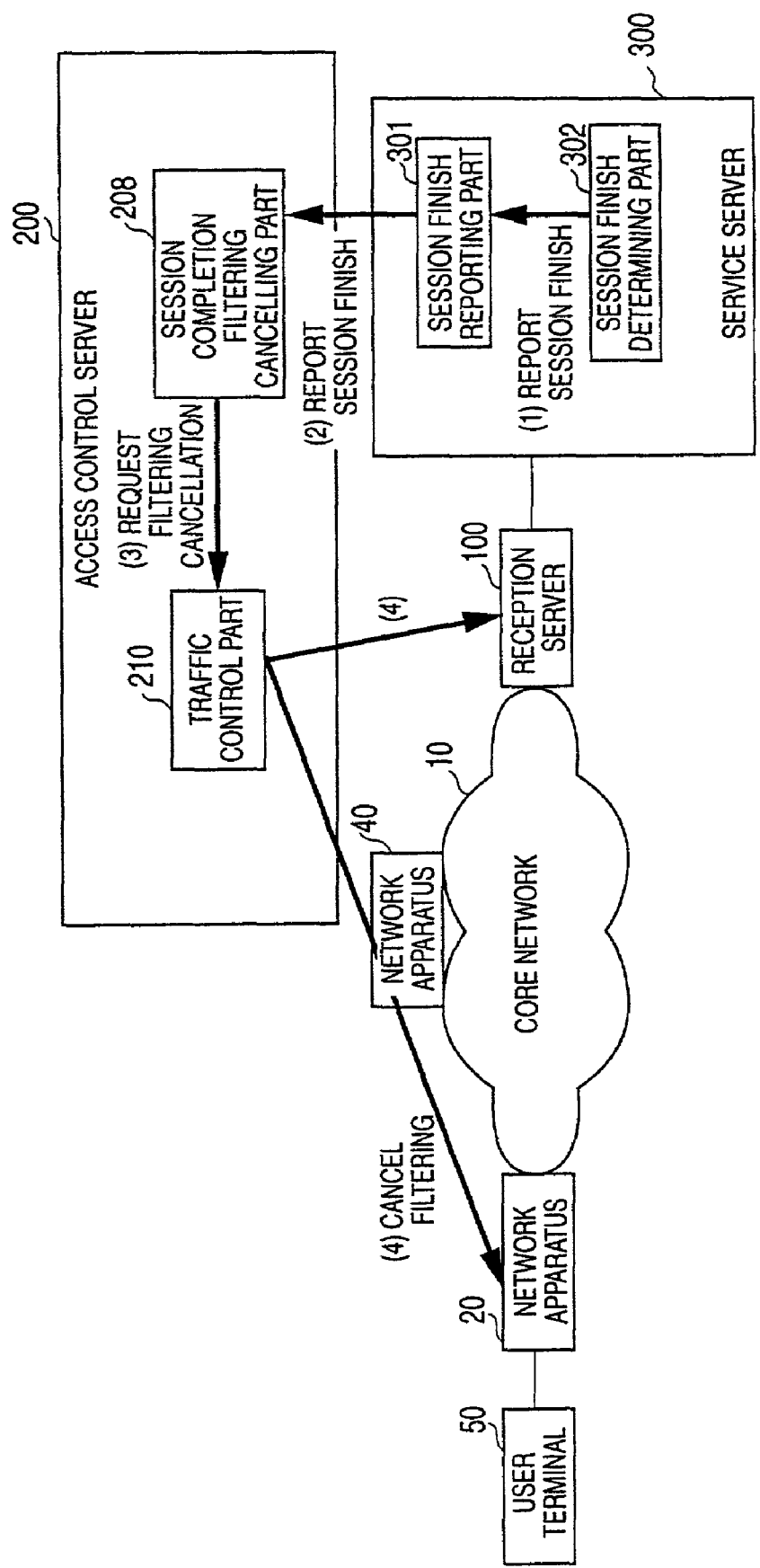
FIG. 8 illustrates a session finish determining function in the method according to the present invention.

In FIG. 8, when the session performed with the user has been finished, the service server 300 sends the session finish report from the session finish determining part 302 to the session finish reporting part 301 (1). The session finish reporting part 301 transmits this matter to the session completion filtering canceling part 208 of the access control server 200 (2). For the connection for which the session has been finished, the session completion filtering canceling part 208 generates the packet filtering canceling information changing the allowance of access to the service server 300 from the user terminal 50 into unallowance, and sends the filtering cancellation request to the traffic control part 210 (3). The traffic control part 210 controls the network apparatuses 20 and 30 appropriately based on this packet filtering canceling information (4).

An access unallowing function of the method according to the present invention will now be described with reference to FIG. 9 excerpted from FIG. 1.

Figure 9:
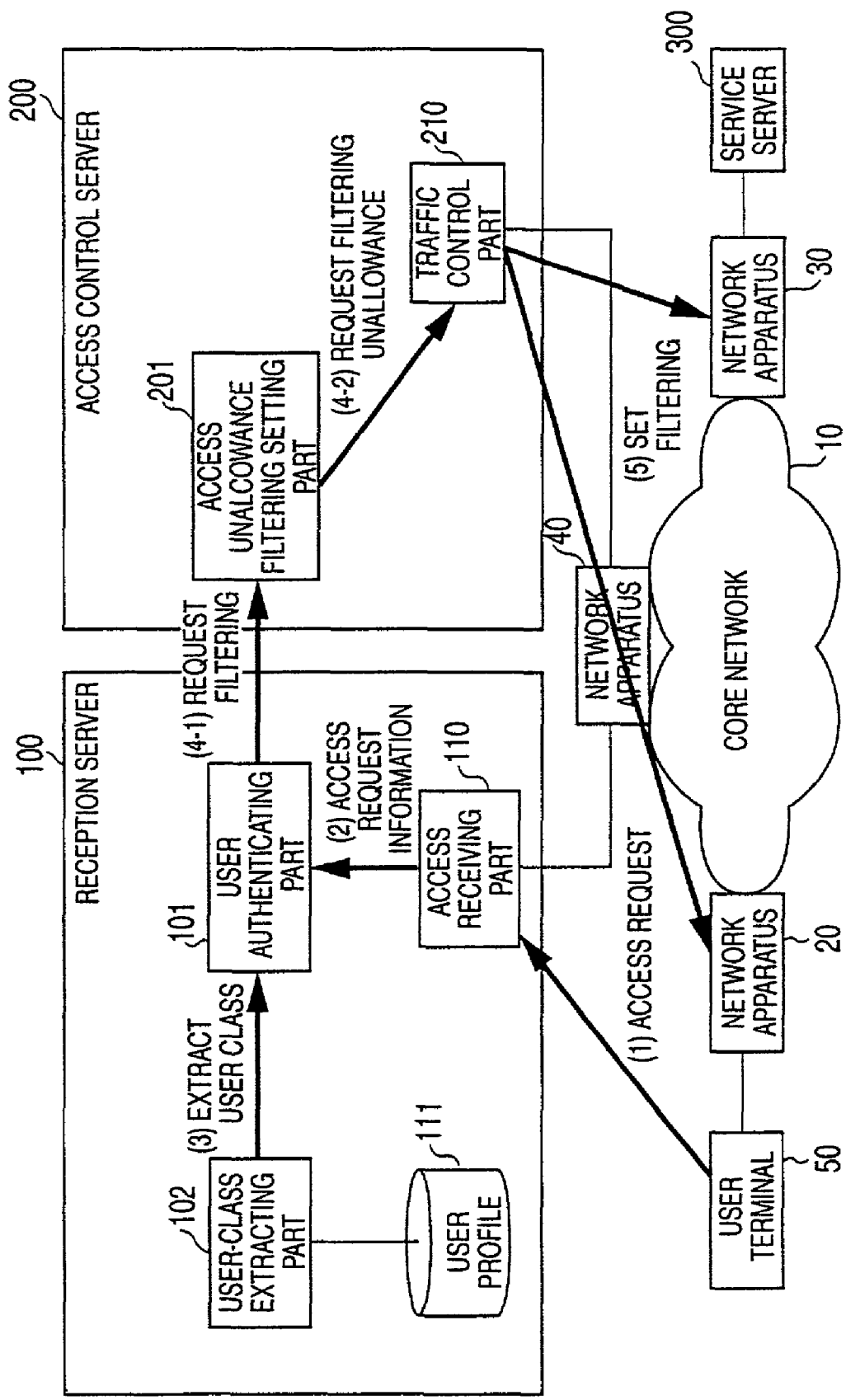
FIG. 9 illustrates an access unallowance filtering function in the method according to the present invention.

In FIG. 9, the user transmits the access request for the service server 300 via the user terminal 50, to the access receiving part 110 of the reception server 100 (1). The access receiving part 110 transmits the access request information to the user authenticating part 101 (2). The user authenticating 101 extracts, via the user-class extracting part 102, the user class (user information) of the user who has sent the access request, from the user profile 111 (3). At this time, when no corresponding user class is found out, or the corresponding user class is of unallowance for access, a filtering request for access unallowance is sent to the access unallowance filtering setting part 201 (4-1).

The access unallowance filtering setting part 201, when receiving the filtering request for access unallowance, generates packet filtering unallowing information making access to the service server 300 by the user terminal 50 which gave the access request be unallowed, and sends a filtering unallowance request to the traffic control part 210 (4-2). Then, the traffic control part 210 controls the network apparatuses 20 and 30 appropriately based on the packet filtering unallowing information (5).

Detailed description of the processing will now be made by showing embodiments of specific services according to the present invention.

A. Reception Proxy Service Through Internet Service Provider

Figure 10:
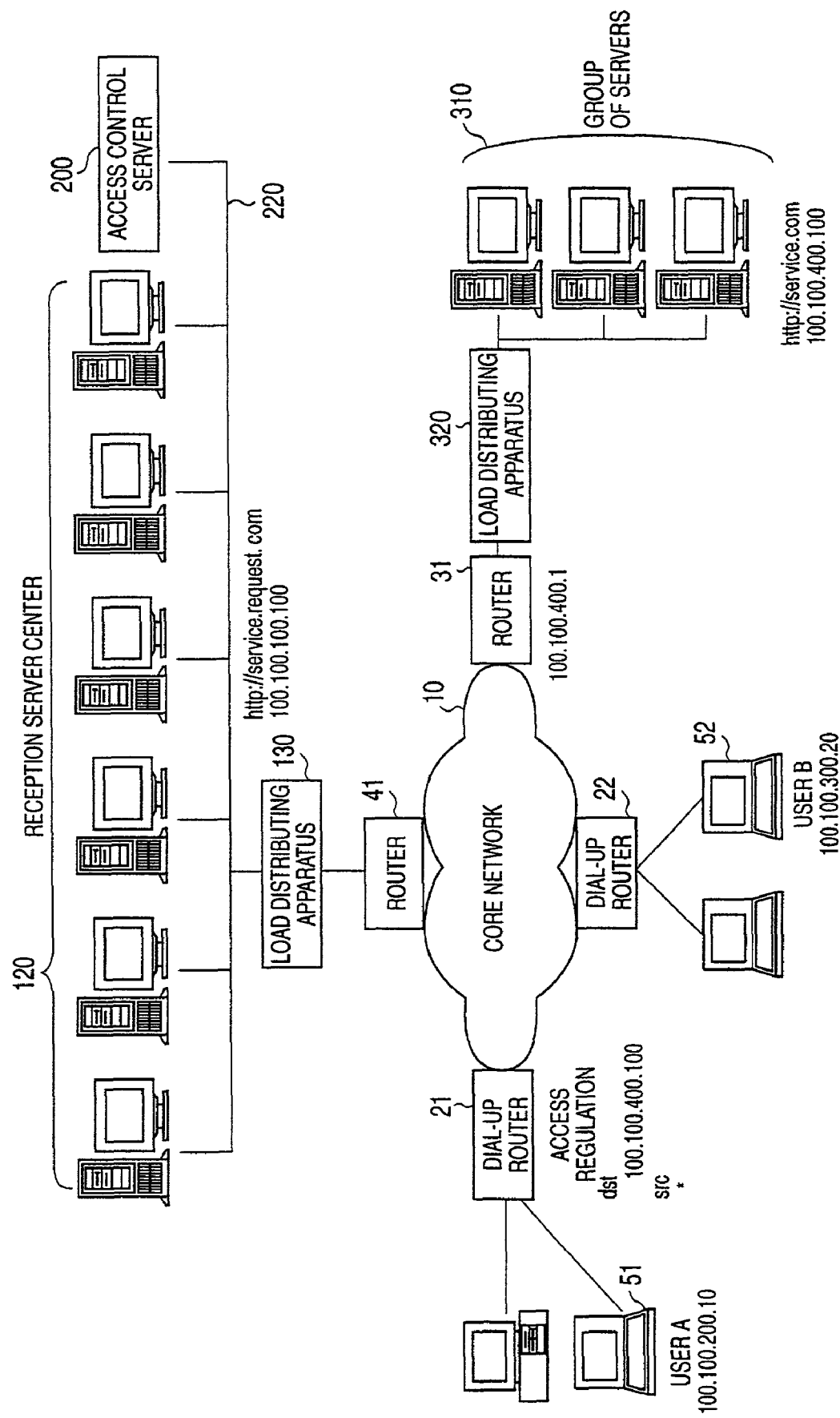
FIG. 10 shows a system configuration in an embodiment of the present invention in which an Internet service provider renders reception proxy service.

FIG. 10 shows a system configuration of an embodiment rendering reception proxy service by an Internet service provider. A site (310) shown in the figure is a site which plans to perform online sales of popular goods, for example, and, accordingly, excess concentration of access traffic is expected therefor. For this site, a plurality of servers 310 and a load distributing apparatus 320, forming the service server 300, are provided in order to deal with concentration of traffic. However, congestion of the servers is expected in response to concentration of traffic immediately after the beginning of the sale.

The service provider from which this site receives an Internet service provides the reception proxy service for sites for which traffic concentration is expected. This service provider has built a reception proxy center including a sufficient number of load distributing servers 120, a load distributing apparatus 130, forming the reception server 100, an access control server 200 and a large-capacity communication line 220.

User terminals 51 and 52 of users A and B are connected to the core network 10 via dial-up routers 21 and 22, acting as the network apparatuses 20, the load distributing apparatus 130 of the reception proxy center is connected to a router 41 acting as the network apparatus 40, and the load distributing apparatus 320 of the site is connected to a router 31 acting as the network apparatus 30.

First, data tables and message tables which are used in this embodiment will now be described.

FIG. 11 shows a data structure of the user profile 111. The user profile 111 has a transmission source IP address (100. 100. 200. 10) which is the IP address of the user terminal 51; a destination IP address (100. 100. 400. 100) which is the IP address of the service server 300; a transmission source port number (80 in a case of the service using WWW, and indicating http) which is a service providing communication port number of the service server 300; the user class which is used as an index of a service using level by user (high priority, medium priority, low priority, unallowed, and so forth, for example) set as unit data thereof. This unit data of the user profile is set for each transmission source IP address and each destination IP address.

Figure 12:
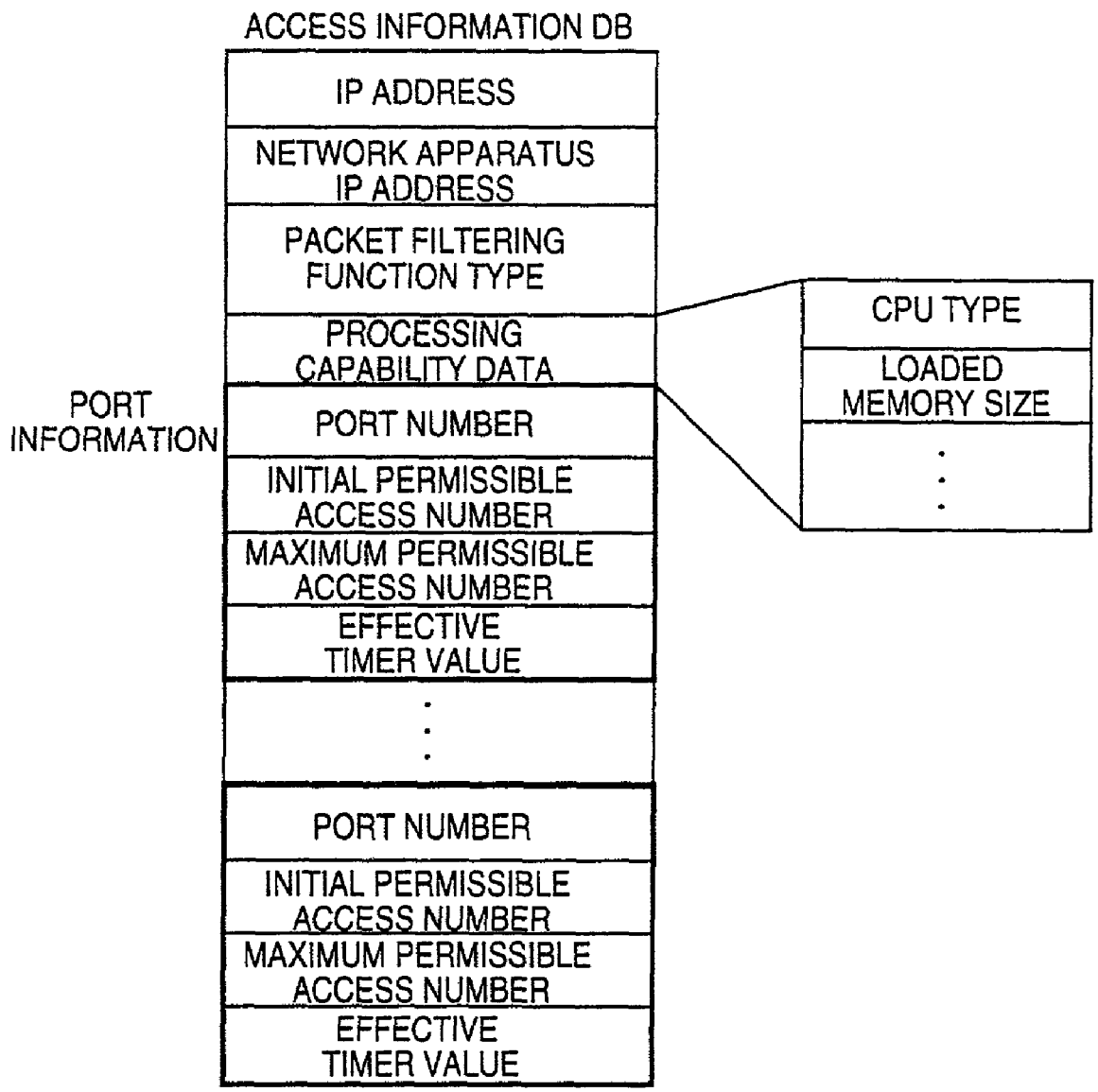
FIG. 12 shows a data configuration of an access information DB shown in FIG. 1.

FIG. 12 shows a data structure of the access information DB 209. The access information DB 209 stores, for example, the IP address (100. 100. 400. 100) of the service server 300; the IP address (100. 100. 400. 1) of the router (network apparatus) 51 to which the service server 300 of this site is connected; a packet filtering function type (for example, SNMP) indicating an interface used when the packet filtering is set; processing capability data indicating the processing capability of the service server of the site; and port information indicating information for port units.

The processing capability data is of a form of a data table (for example, including data of CPU type, loaded memory size, and so forth) indicating the processing capability of the service server 300, and each data is expressed by percentage. For example, in a case of high-speed CPU, data '150' is set, and, an initial permissible access number is multiplied by 1.5, and thus, the maximum permissible access number to be set is obtained. In a case of low-speed CPU, data '50' is set, and the initial permissible access number is multiplied by 0.5, and thus, the maximum permissible access number to be set is obtained.

The port information includes a port number, the initial permissible access number, maximum permissible access number and effective timer value. For example, in a case where information given for the site at the time of the contract is such that: maximum access number=100; and average access time=5 minutes, the following information is set: 80 (indicating http) for the port number; 100 for the maximum permissible access number; and 7 minutes (corrected from 5 minutes) for the effective timer value. The effective timer value is a connection time between the server and the user which is estimated to be needed for a manager of the service server 300 to provide the service to the user. The effective timer value is one for which the manager of the service server 300 previously should apply to the reception proxy center.

Further, the data of the access information DB 209 is also used as data for the user for the purpose of access control of the network apparatuses. In such a case, only the data of IP address, network apparatus IP address and packet filtering function type is set, and the other data is not set.

Figure 13:
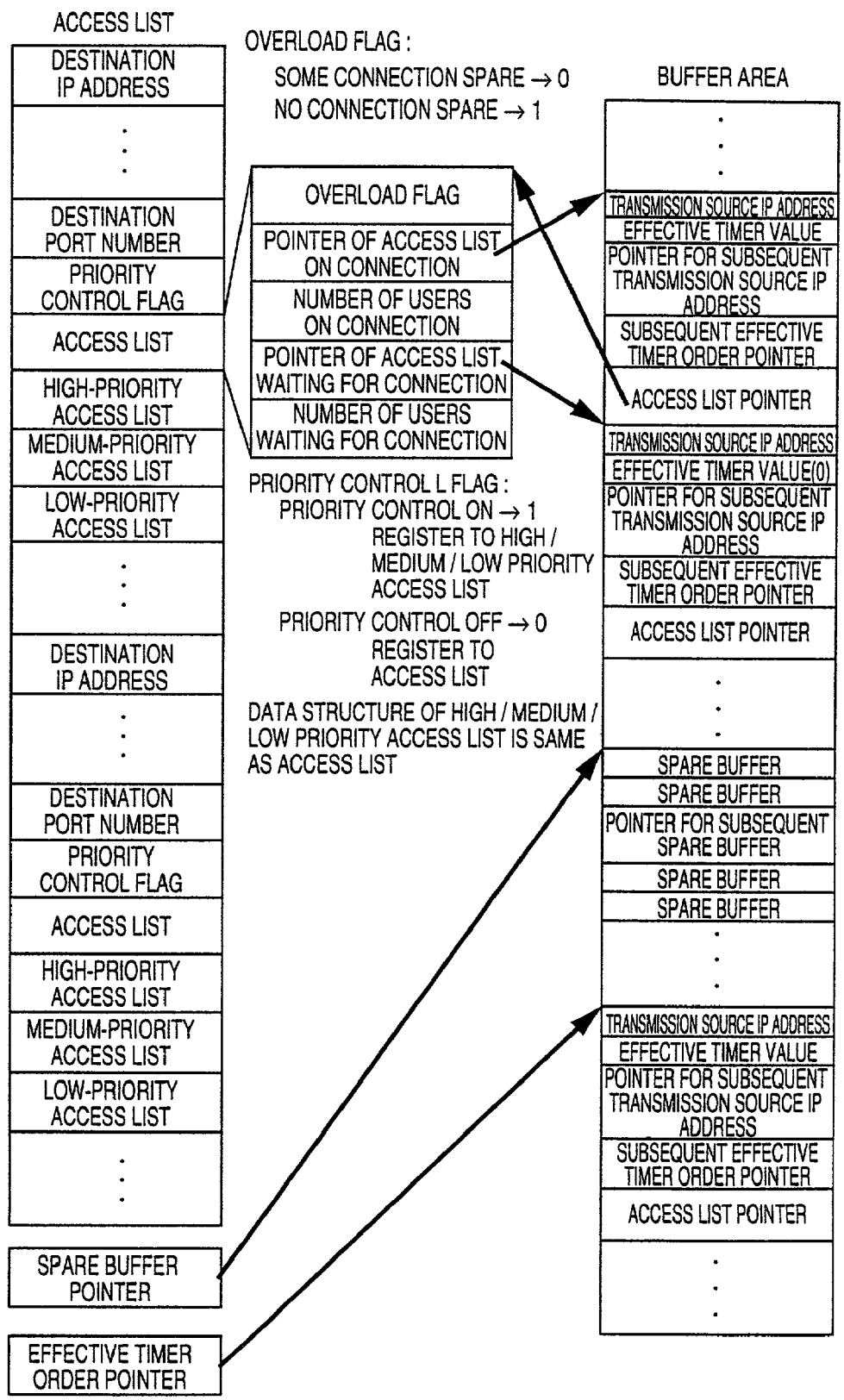
FIG. 13 shows a data configuration of an access list shown in FIG. 1.

FIG. 13 shows a data structure of the access list 109. The access list 109 includes the destination IP address (100. 100. 400. 100) which is the IP address of the service server 300; a destination port number (for example, 80) which is a port number of a target application; a priority control flag indicating existence/absence of priority control; and access lists queuing access requests sent from the users for the service server 300. The access lists include access lists used in a case where the priory control flag indicates no priority control is performed, high-priority access lists, medium-priority access lists and low-priority access lists classified according to the priority (high priority, medium priority, low priority, and so forth) used in the case where the priority control is performed.

Each access list of the access list 109 includes an overload flag indicating whether or not it is possible to connect to the current target server by the user; a pointer of access list on connection which is a queue (buffer area) for the currently connected user; the number of users on connection queued in the access list on connection; a pointer of access list waiting for connection which is a queue for the user who is waiting; and the number of users waiting for connection queued in the access list waiting for connection.

The priority control flag is set to be existence of priority control, as a result of the manager of the service server 300 previously applying to the reception proxy center, in a case where the manager of the service server 300 wishes the priority control by user class. The overload flag is used for determining whether or not the server for which the user currently requests to access has a spare for connection.

Further, a spare buffer pointer indicating a top of a spare buffer list, and an effective timer order pointer which is queued at a time of expiration of the effective timer, are provided, as shown in FIG. 13.

Figure 14:
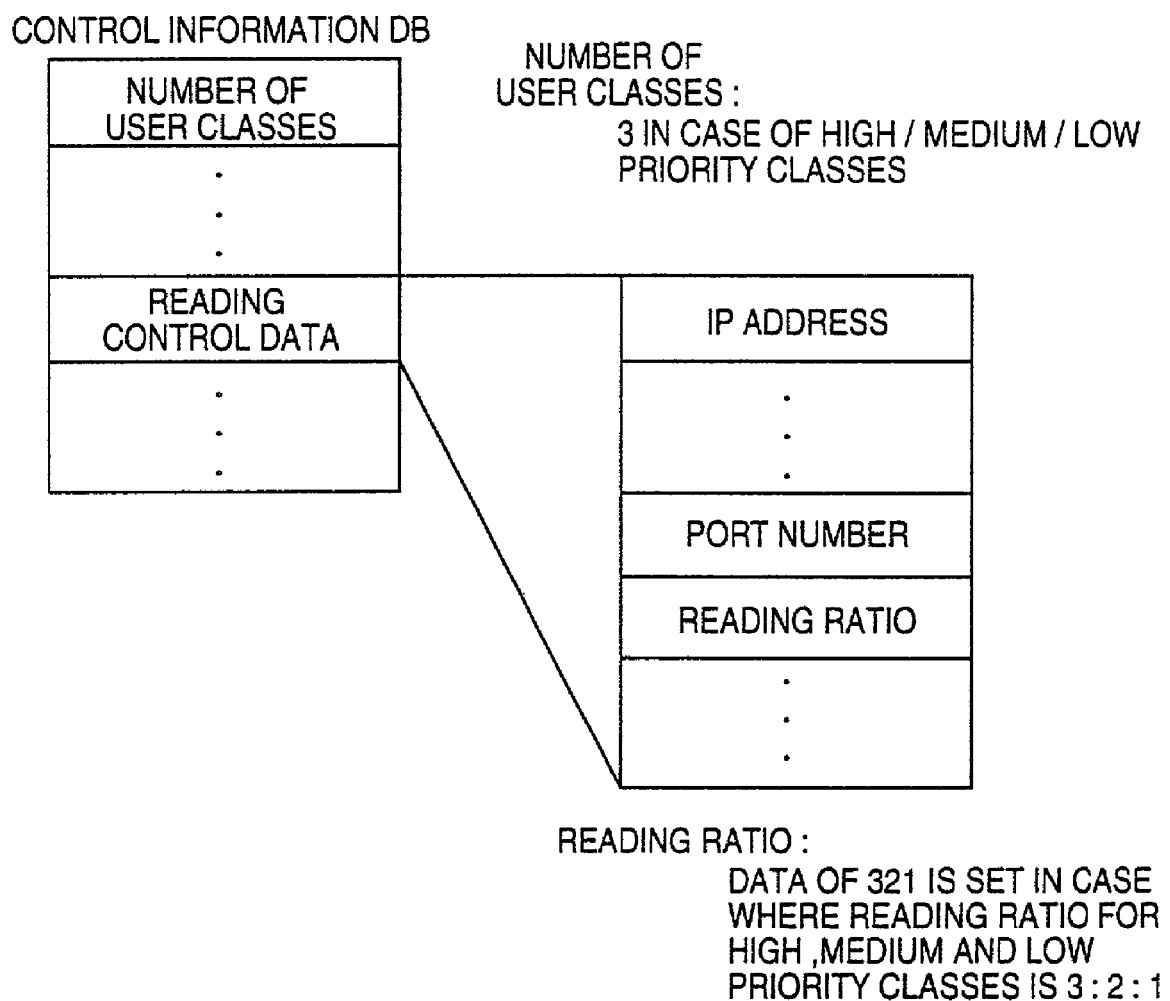
FIG. 14 shows a data configuration of a control information DB shown in FIG. 1.

FIG. 14 shows a data structure of the control information DB 211. The control information DB 211 stores the number of user classes (for example, 3 is set in a case of the high priority/medium priority/low priority) which is the number of user classes used when the priority control provided by the reception proxy center is rendered; and reading control data which is set for each service server 300 for which the priority control is requested. The reading control data includes the IP address of the service server 300, and a reading ratio at which reading is performed by user class from the access list 109 for each port number which is the port number of target application.

A case where the Internet service provider shown in FIG. 10 renders the reception proxy service will now be described.

(1) Contract for Reception Proxy Service

The site (service. com) shown in FIG. 10 makes the contract with the service provider for reception proxy service. At the time of contract, the site (service. com) informs the service provider of the http address for the own site, IP address, server processing capability of the own site (the maximum processing number, average access time for each person, and so forth).

The service provider registers the information thus informed by the site in the access information DB 209 shown in FIG. 12, and, then, issues a URL such as 'http://service. request. com' to the site. The site having had the URL issued publishes this URL together with an effective period of this URL (period of the contract for the reception proxy service) to general users.

Figure 15:
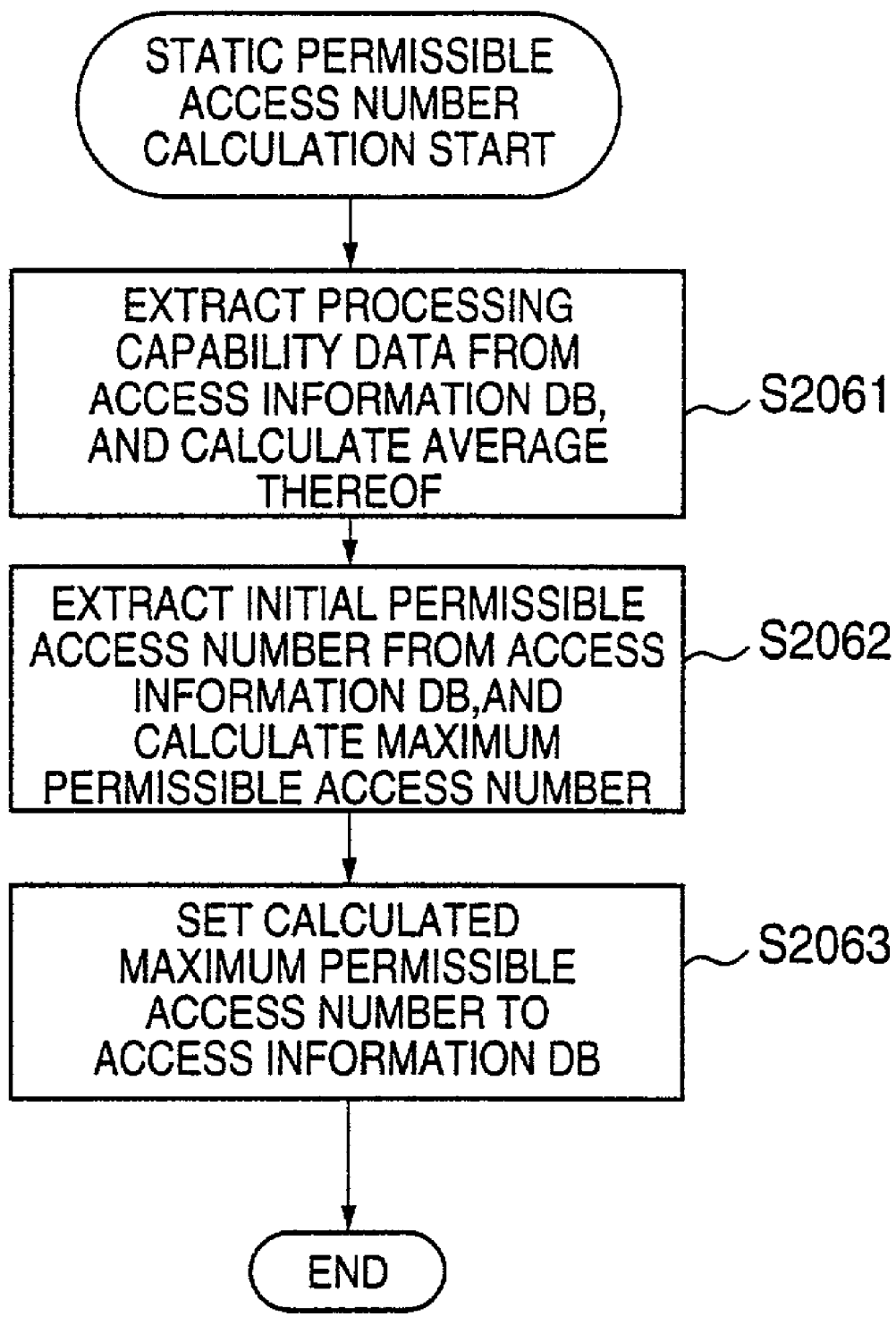
FIG. 15 shows a flow chart of processing performed by a static permissible access number calculating part shown in FIG. 1.

Instead of having the specific access number and access time informed by the site which is the customer, the service provider may built a system for calculating the maximum permissible access number from the processing capability data of the control information DB 211. FIG. 15 shows a flow chart of processing performed by the static permissible access number calculating part 206 in such a case.

In FIG. 15, the static permissible access number calculating part 206 extracts the processing capability data from the access information DB 209 in a step S2061. Then, in a step S2062, the maximum permissible access number is calculated from the extracted processing capability. Specifically, for example, as the processing capability data of the access information DB 209, data of 150% is set in a CPU correspondence table or the like defined in the reception proxy center in a case where a high-speed CPU is loaded. Similarly, data of 200% is set in a loaded memory correspondence table defined in the reception proxy center in a case where a large-capacity memory is loaded. Then, the above-mentioned maximum permissible access number is calculated by the following formula, in which the data is averaged, for example:

(initial permissible access number)×(1.5+2.0)/2 from the initial permissible access number previously defined in the reception proxy center.

Finally, in a step S2063, the thus-calculated maximum permissible access number is set in the access information DB 209.

(2) Beginning of Reception Proxy Service

The service provider sets access regulation for the IP address 100. 100. 400. 100 of the site to the edge routers of the network under management of the provider such as the dial-up routers 20, 22 for general users, and a boundary router for connecting to another provider, immediately before the beginning of the reception proxy service via a maintenance console or the like. The access regulation is rendered by discarding IP packets addressed to the specified IP address in the routers 21, 22 and so forth. This function is called filtering, in general, and many network apparatuses have this function recently. The setting interface depends on the network apparatus. For example, SNMP, or an original CLI (Command Line Interface) is used.

Thereby, after the time of beginning of the reception proxy service, users cannot directly access 'http://service. com', and, only access via 'http://service. request. com' is effective for this site.

(3) Summary of Processing performed in the Reception Proxy Center

The user inputs 'http://service. request. com' via the user terminal 51 or 52 using an Internet browser, and accesses the reception proxy center. The reception proxy center transfers the request to any server of the load distributing servers 120 using a conventional system for server load distribution.

The reception server 100 receives the http protocol via the access receiving part 110, and transfers the information to the access registering part 103. The access receiving part 110 is specifically a server application prepared only for reception, and is described by a script language such as html, Java, or the like. Through this application, the access request information such as that shown in FIG. 16 is extracted, and the information is transferred to the access registering part 103 via inter-process communication. At a time of initial access, that is, at a time of access to 'http://service. request. com', an access request is set by request type.

FIG. 16 shows a message structure of the access request information. The access request information includes the request type (an access request, a waiting response request, and a waiting denial request), a transmission source IP address of the user terminal, a destination IP address which is the IP address of the service server 300, and a destination port number which is the port number of a target application for the service server 300 to perform communication with the user.

Figure 17:
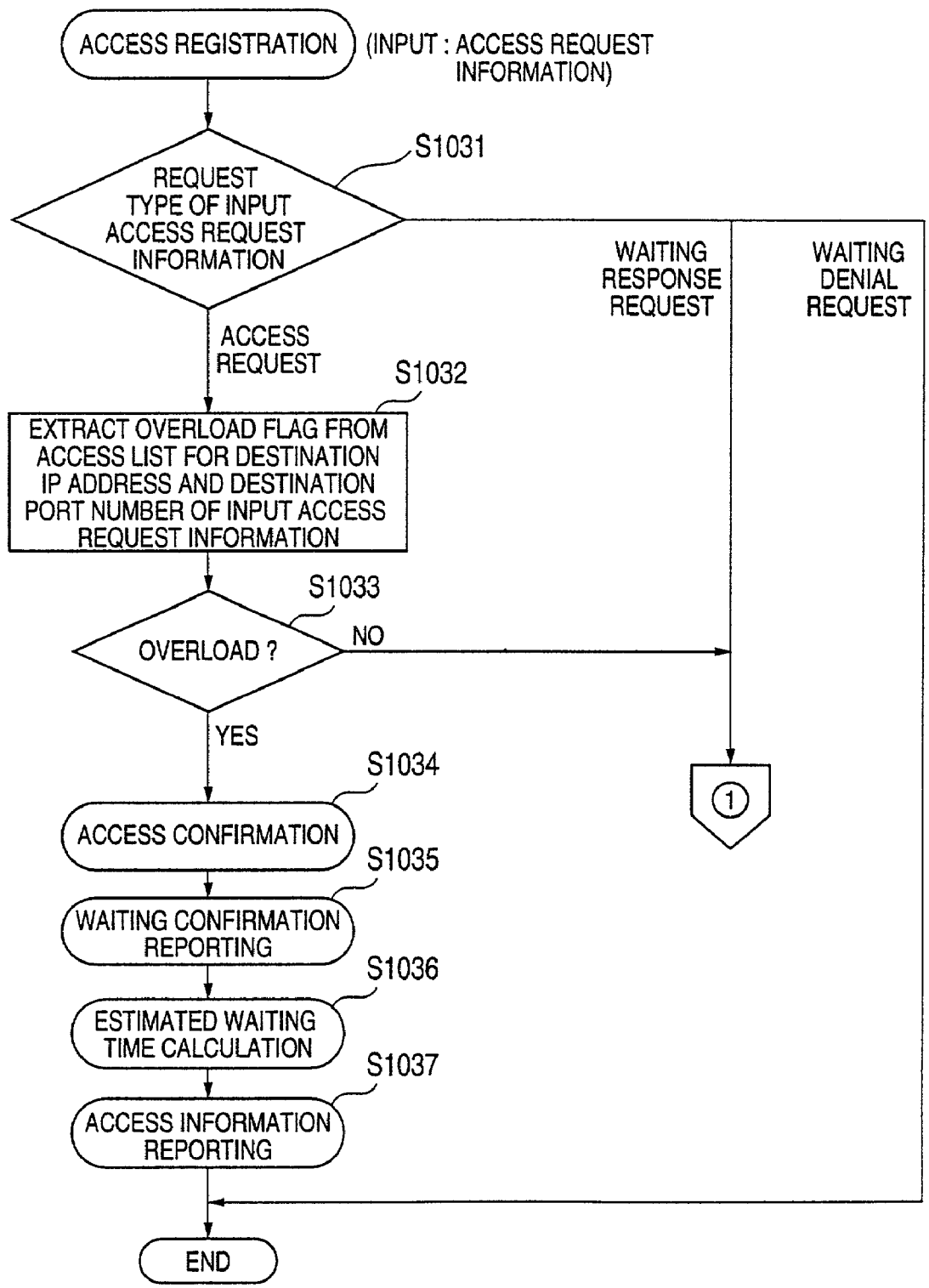
FIGS. 17 and 18 show a flow chart of processing performed by an access registering part shown in FIG. 1.
Figure 18:
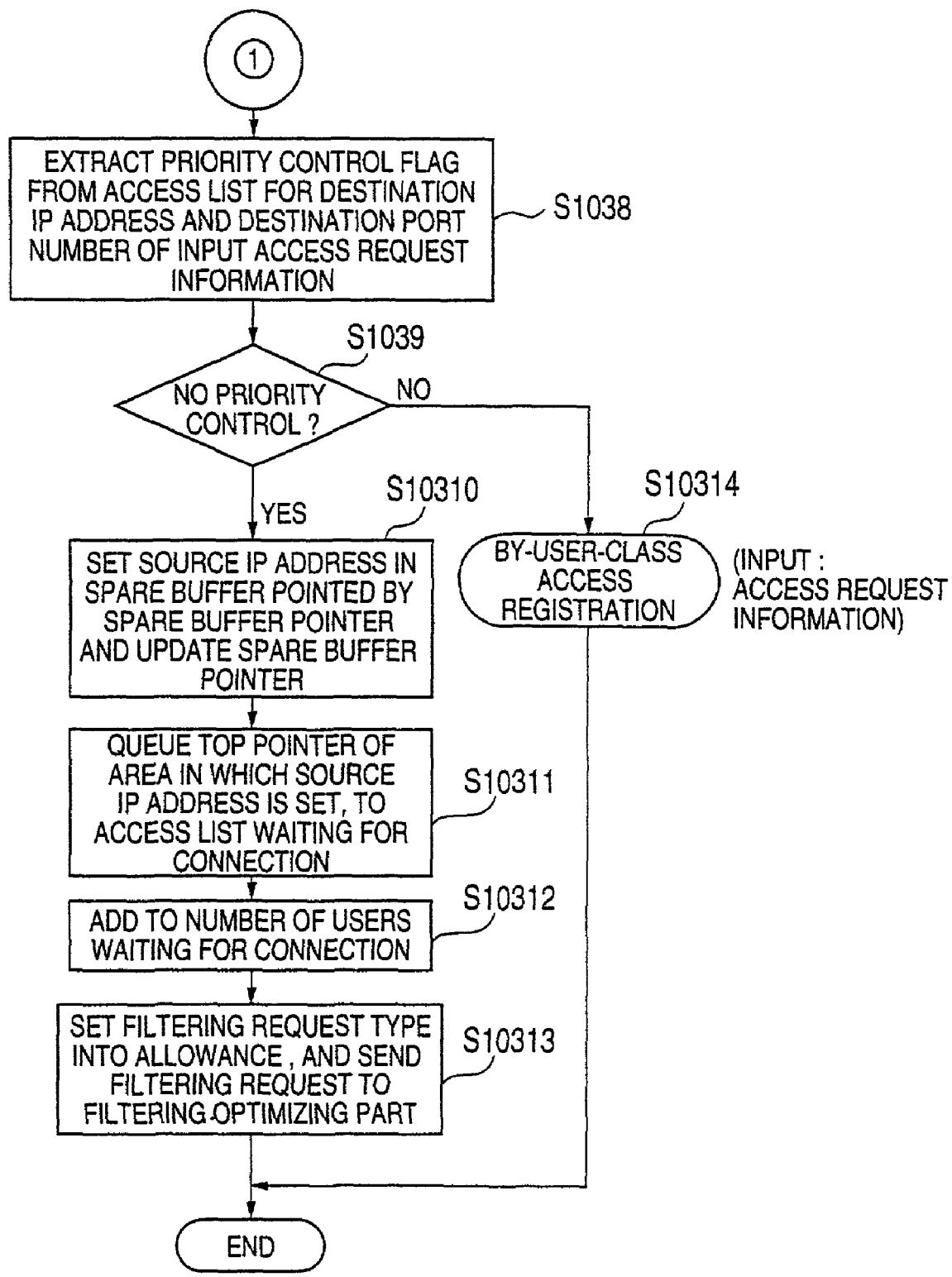

FIGS. 17 and 18 show a flow chart for illustrating processing performed by the access registering part 103 in detail. First, the access registering part 103 determines the request type of the received access request information, in the step S1031 of FIG. 17. In this case, the request type of the access request information is the access request. Accordingly, a step S1032 is performed. Then, the access list 109 is searched by the IP address and port number of the access request information, and the overload flag indicating the connection state of the relevant access list is determined. In this case, no overload condition exists, and a step S1038 shown in FIG. 18 is performed.

However, in a case of overload condition, a step S1034 of FIG. 17 is performed for reporting the user to wait and an estimated waiting time. With regard to the reporting the user to wait and the estimated waiting time, description will be made later in description for User Reporting in Reception Proxy Center.

In the step S1038, the priority control flag is extracted from the access list extracted from the access list 109, and whether or not the priority control exists is determined in a step S1039. In this case, it is assumed that no priority control is set, and, then, a step S10310 is performed. With regard to a case where the priority control is set, description will be made later in description for Priority Control Service by Service Class.

In the step S10310, the spare buffer of the buffer area of the access list 109 shown in FIG. 13 is searched for, the transmission source IP address (100. 100. 200. 10) of the input access request information is set in the thus-obtained spare buffer, and the spare buffer pointer is updated. In a step S10311, the newly captured buffer is queued to the access list waiting for connection of the access list 109. In a step S10312, the number of users waiting for connection in the relevant access list is updated. With regard to the control for the queuing, a well-known method may be used therefor, and description will be omitted.

Figure 19:
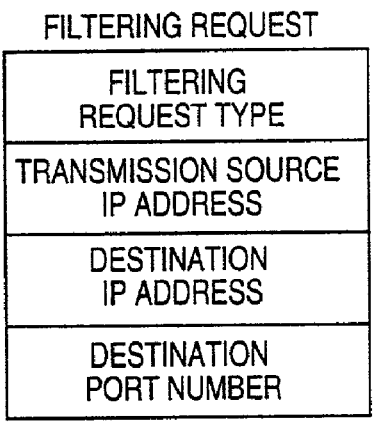
FIG. 19 shows a message structure of a filtering request.

In a step S10313, an allowance request is set in a filtering request type of a filtering request shown in FIG. 19, other information is copied from the access request information and set therein, and control by the filtering optimizing part 204 is started.

FIG. 19 shows a message structure of the filtering request. The filtering request includes the request type (an allowance request, an unallowance request, a priority control allowance request, or a cancellation request for canceling access allowance) indicating the processing guideline to the filtering optimizing part 204, the transmission source IP address which is the IP address of the user terminal, the destination IP address which is the IP address of the service server 300, and the destination port number which is the port number of the target application for the service server 300 to perform communication with the user.

Figure 20:
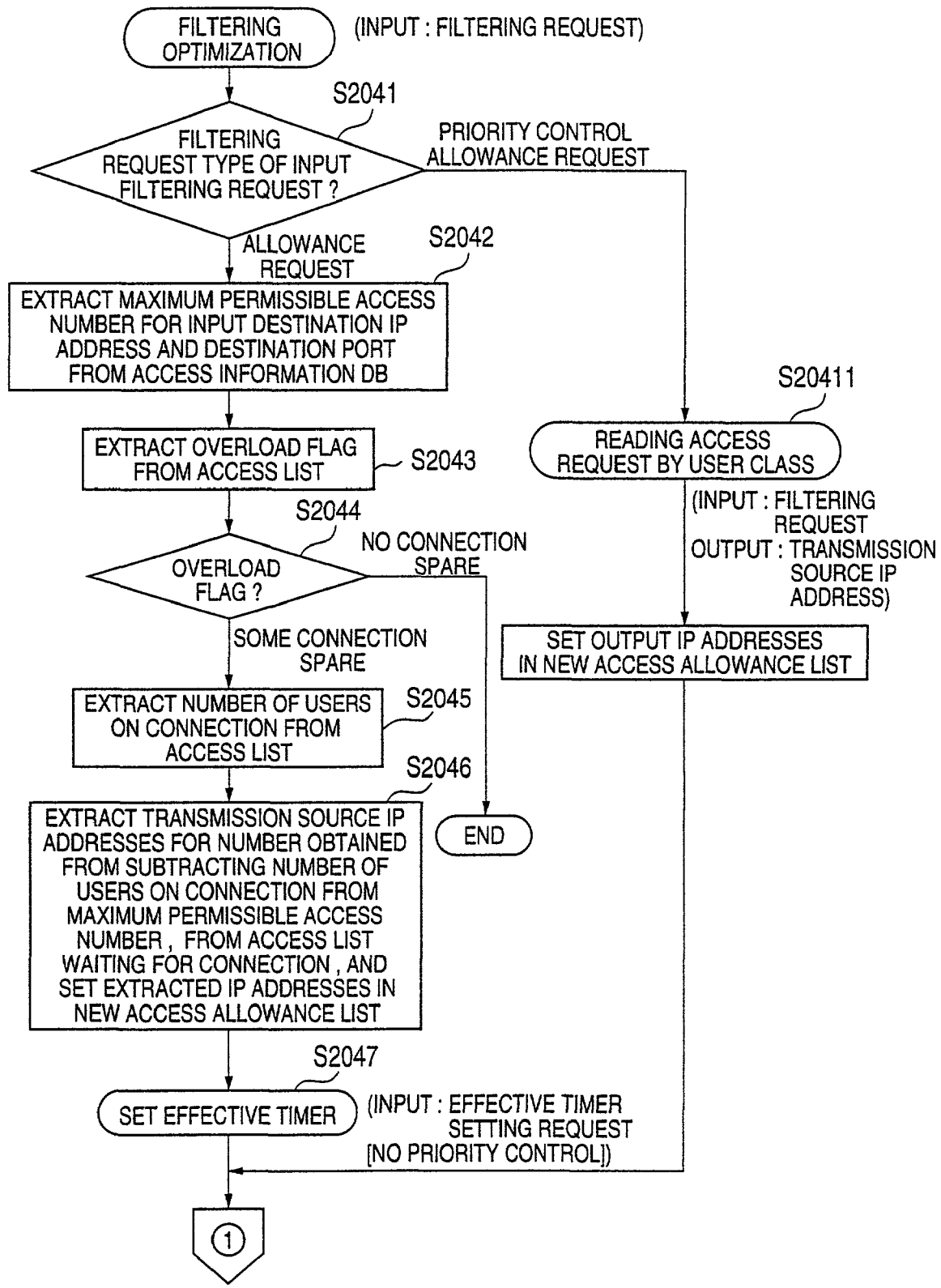
FIGS. 20 and 21 show a flow chart of processing performed by a filtering optimizing part shown in FIG. 1.
Figure 21:
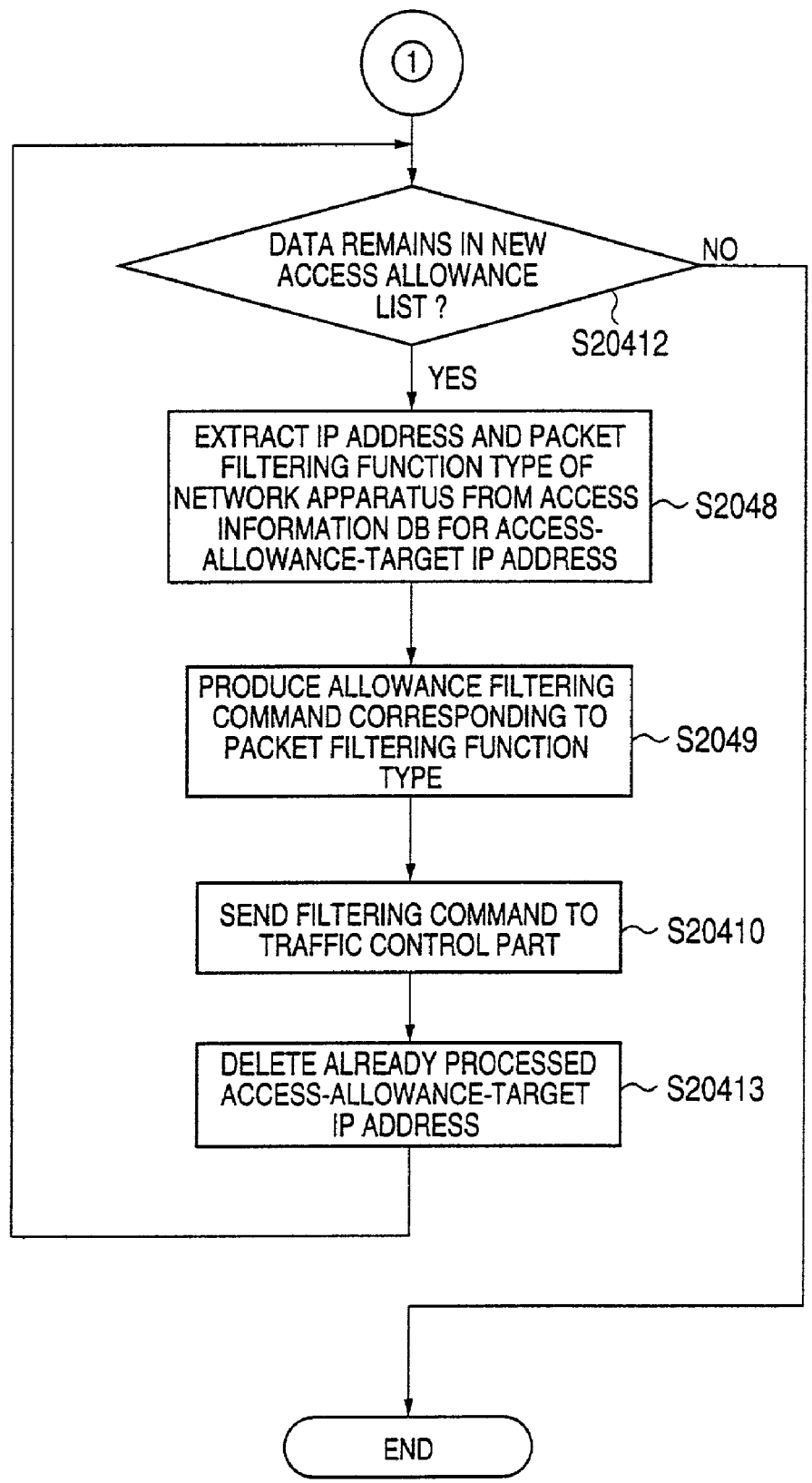

FIGS. 20 and 21 show a flow chart for illustrating processing performed by the filtering optimizing part 204 in detail. This processing is performed for all the instances registered in the access information DB 209. However, for the sake of simplifying the description, only processing for one instance will be described.

First, the filtering optimizing part 204 determines the filtering request type of the input filtering request in a step S2041 of FIG. 20. When the filtering request type is the allowance request, a step S2042 is performed. When it is the priority control allowance request, the access request is read by user class. With regard to processing in that the access request is read by user class, description will be made later in the description for Priority Control Service by Service Class.

In a step S2042, the maximum permissible access number is extracted from the access information DB 209 corresponding to the port number. Then, in a step S2043, the overload flag is extracted from the access list 109. In a step S2044, the overload flag is determined, and, when it indicates that there is no spare for connection, the current processing is finished.

When the overload flag indicates that there is a spare for connection, the number of users on connection is extracted from the access list 109, in a step S2045. Then, in a step S2046, the transmission source IP addresses are extracted from the access lists waiting for connection of the access list 109 for a number obtained from subtracting the number of users on connection from the maximum permissible access number. The thus-extracted transmission source IP addresses are set in a new access allowance list prepared for this purpose which is internal data. Then, in a step S2047, the effective timer setting part 203 is started, and a step S20412 is performed. Processing performed by the effective timer setting part 203 will be described later.

In a step-S20412 shown in FIG. 21, loop processing (repetition) is performed until the above-mentioned new access allowance list has no IP addressees remaining there. In a step S2048, the IP address and packet filtering function type of the network apparatus for the access-allowance-target IP address are extracted from the access information DB 209. Then, in a step S2049, an allowance filtering command corresponding to the packet filtering function type is generated. In a step S20410, the generated allowance filtering command and the IP address of the network apparatus extracted in the step S2048 are set in a filtering command execution request shown in FIG. 22, and, then, control by the traffic control part 210 is started. Then, in a step S20413, the access-allowance-target IP address which has been thus processed is deleted from the above-mentioned new access allowance list.

Figure 22:
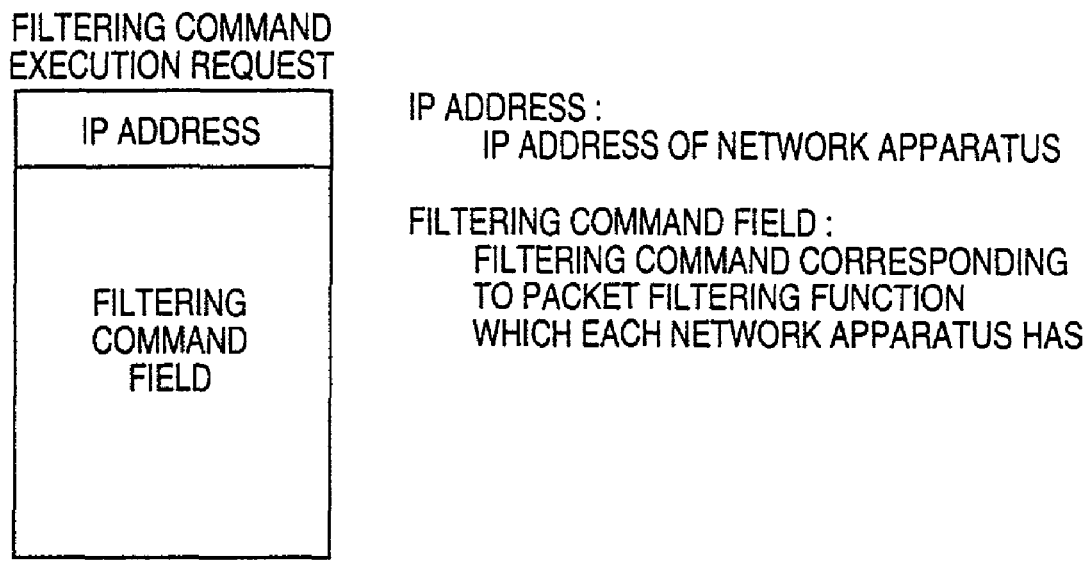
FIG. 22 shows a message structure of a filtering command execution request.

FIG. 22 shows a message structure of the above-mentioned filtering command execution request. The filtering command execution request includes the IP address of the network apparatus which executes the filtering and a filtering command field. In the filtering command field, a command in executable level is set such as 'ipchains-s 100. 100. 200. 10-d 100. 100. 400. 100.-p http-j DENY' when unallowance is set for access from the user terminal 51 (100. 100. 200. 10) to the service server 300 (100. 100. 400. 100) through WWW (http).

Figure 23:
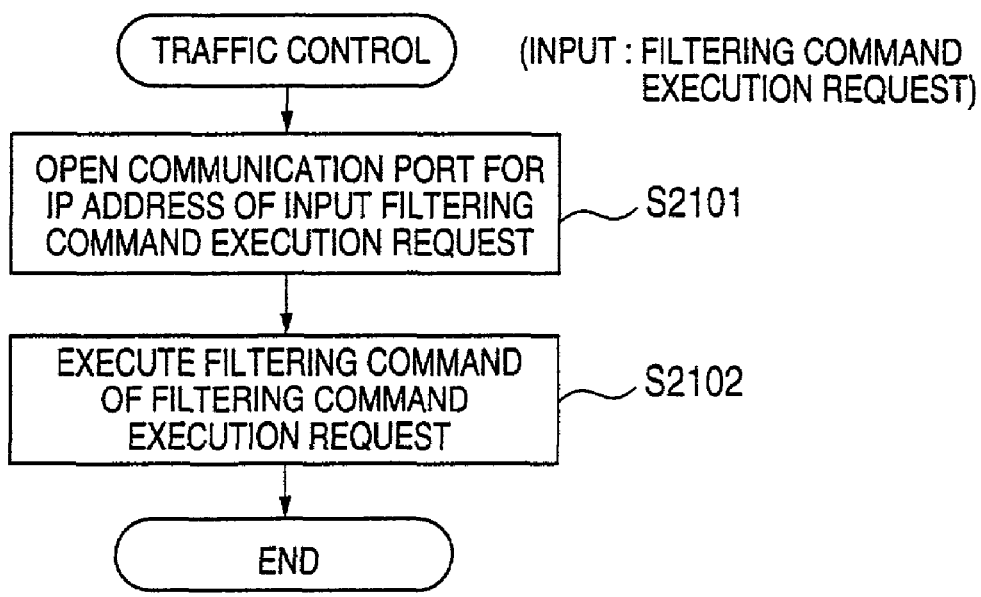
FIG. 23 shows a flow chart of processing performed by a traffic control part shown in FIG. 1.

FIG. 23 shows a flow chart for illustrating processing performed by the traffic control part 210 in detail. The traffic control part 210 first opens a communication port by using Telnet or the like for the IP address of the input filtering command execution request, in a step S2101. Then, in a step S2102, through the thus-opened communication port, the filtering command of the input filtering command execution request is executed. In this case, as a result of the filtering command being executed, the user can directly access 'http://service.com'.

(4) Cancellation of Access Allowance in Reception Proxy Server

An example of processing of canceling access allowance for the user to access 'http://service. com' will now be described.

For canceling the access allowance, the reception proxy center includes a part canceling at a time the access effective timer for the service server 300 expires, and, when a service session between the service server 300 and the user, such as, for example, a session for downloading video data, a session for a purchasing procedure in online shopping, or the like, has finished, a part reporting to the reception proxy center from the service server 300 this matter.

The part canceling at a time the access effective timer for the service server 300 expires is the effective timer setting part 203 which starts during processing performed by the filtering optimizing part 204, and sets the effective timer value in the access list 109.

Figure 24:
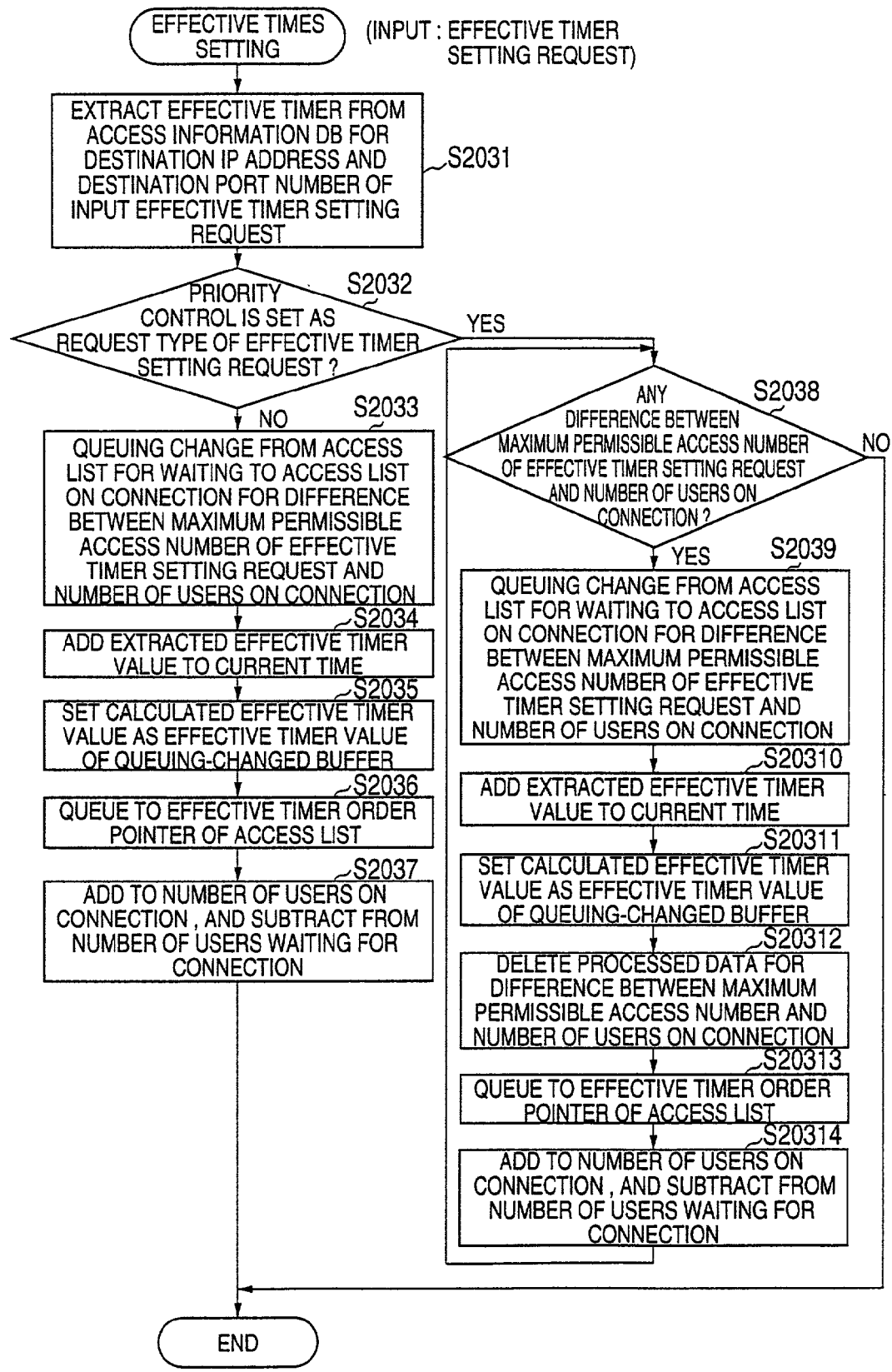
FIG. 24 shows a flow chart of processing performed by an effective timer setting part shown in FIG. 1.

FIG. 24 shows a flow chart for illustrating processing performed by the effective timer setting part 203 in detail. The effective timer setting part 203 extracts the effective timer value for the destination IP address and destination port number of the input effective timer setting request, from the access information DB 209, in a step S2031. Then, in a step S2032, it is determined whether the request type of the input effective timer setting request is 'priority control ON (existence)' or 'priority control OFF (absence)'. In this case, it is assumed that 'priority control OFF' is set, then, a step S2033 is performed.

In the step S2033, queue is shifted from the access list waiting for connection to the access list on connection of the access list 109 for a number obtained from subtracting the number of users on connection from the maximum permissible access number of the input timer setting request. In a step S2034, the effective timer value extracted in the step S2031 is added to the current time. In a step S2035, the value calculated in the step S2034 is set in an effective timer value of the queue shifted to the access list on connection of the access list 109.

For example, the effective timer value extracted from the access information DB 209 is seven minutes, and the current time is seven thirty, the addition result is seven thirty-seven. Then, the time at which the access allowance for the service server 300 is cancelled is seven thirty-seven. Then, in a step S2036, the buffer area in which the above-mentioned time at which the access allowance is canceled is set is queued to the effective time order pointer of the access list 109. Then, in a step S2037, addition is made to the number of users on connection for the destination IP address and destination port number of the input effective timer setting request in the access information DB 209, and subtraction is made from the number of users waiting for connection therefor.

Because the time during which the user can access the service server 300 is set by the effective timer part 203, the filtering canceling part 202 periodically checks as to whether or not this time of access allowance has expired. Then, when the time of access allowance has expired, the access allowance for the user to access the service server 300 is cancelled thereby.

Figure 25:
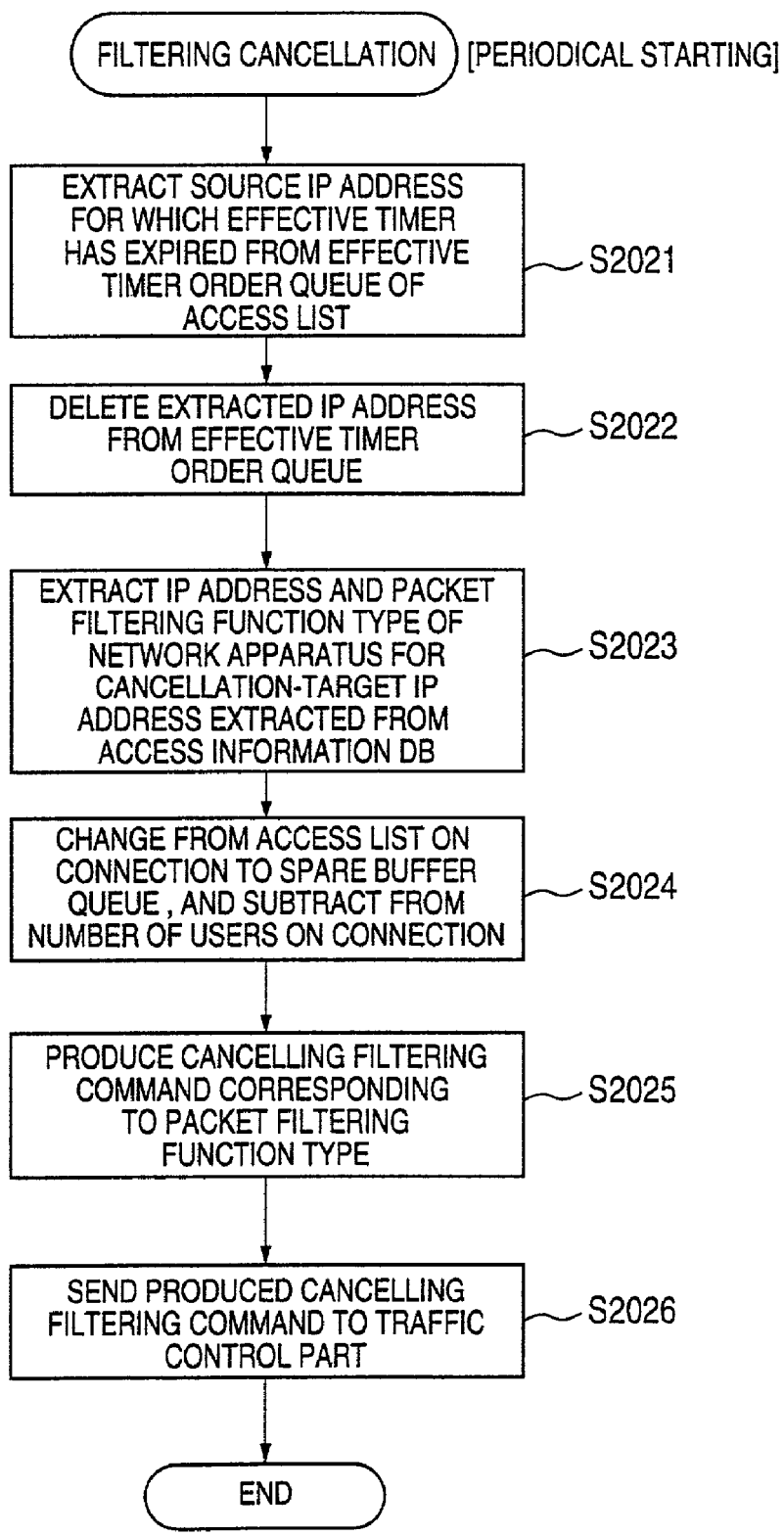
FIG. 25 shows a flow chart of processing performed by a filtering canceling part shown in FIG. 1.

FIG. 25 shows a flow chart-illustrating processing performed by the filtering canceling part 202 in detail. The filtering canceling part 202 is called periodically by starting of a timer of an OS (Operation System) built by the system. First, in a step S2021, the transmission source IP address for which the effective timer has expired is extracted, from the queue queued by the effective timer order pointer of the access list 109. In a step S2022, the thus-extracted address is deleted from the queue queued by the effective timer order pointer.

Then, in a step S2023, the IP address and packet filtering function type of the network apparatus for the IP address extracted in the step S2021 for which the access allowance is cancelled, is extracted. Then, in a step S2024, the IP address extracted from the queue queued by the effective timer order pointer of the access list 109 in the step S2021 is shifted from the access list on connection of the access list 109 to the spare buffer queue thereof, and subtraction is made from the number of users on connection thereof.

Then, in a step S2025, the filtering command for canceling the access allowance corresponding to the packet filtering function type is produced. In a step S2026, the thus-produced filtering command and the IP address of the network extracted in the step S2023 are set into the filtering command execution request shown in FIG. 22. Then, control by the traffic control part 210 is performed. Then, as a result of the traffic control part 210 executing the filtering command canceling the access allowance, the user comes to not be able to access 'http://service. com' directly.

The above-mentioned part reporting that the service session has finished from the service server 300 to the reception proxy server when the service session between the service server 300 and the user has finished will now be described.

In a case where communication for the session such as the session of downloading video data purchased by the user, or the session for the purchasing procedure in the online shopping is to be prevented from being interrupted, the service server 300 may set the average access time per person, indicating the processing capability of the server of the own site to be informed at the time of contract for the reception proxy service with the service provider, to be long. Then, the part which periodically canceling the access allowance may not be substantially used, and, instead, the service server 300 may substantially use the session finish reporting shown in FIG. 27 performed by the session finish reporting part 301.

Figure 26:
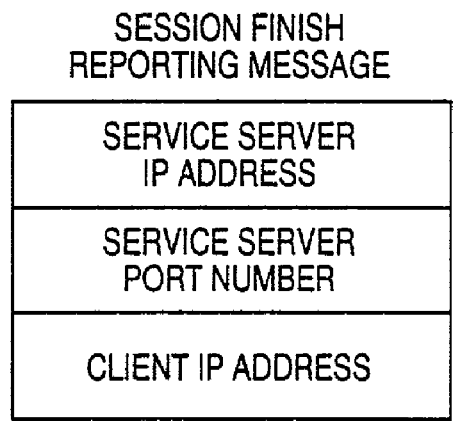
FIG. 26 shows a message structure of a session finish reporting message.
Figure 27:
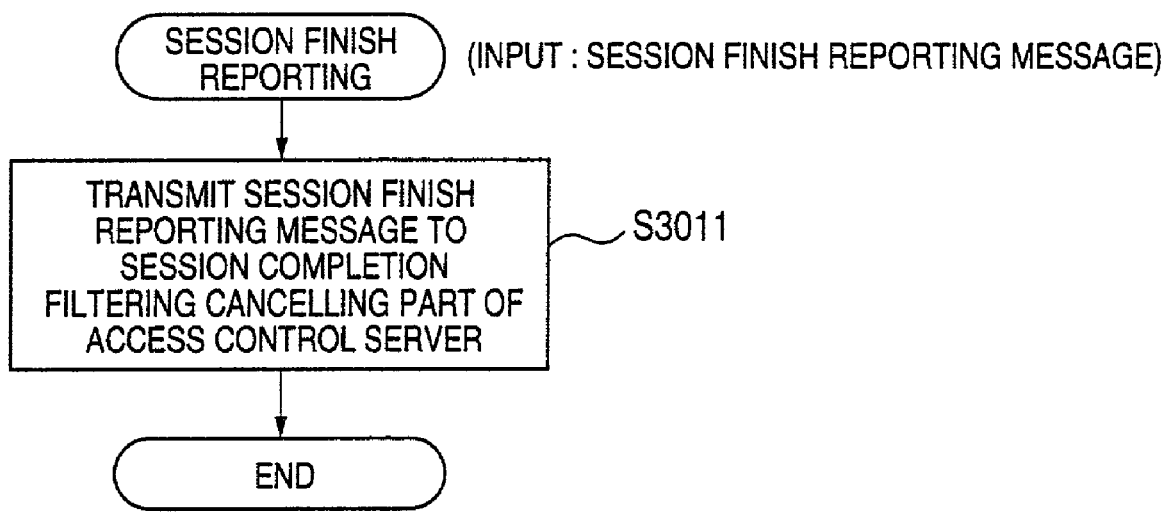
FIG. 27 shows a flow chart of processing perform by a session finish reporting part shown in FIG. 1.

FIG. 27 shows a flow chart for illustrating processing performed by the session finish reporting part 301 in detail. The service server 300 determines finish of the session using the conventional session finish determining part 302. Then, the own IP address is set as a service server IP address of a session finish reporting message shown in FIG. 26, the port number used in the session performed with the user into the a service server port number thereof, and the IP address of the user with which the session is performed into a client IP address thereof. Then, the session finish reporting part 301 is started. Thereby, the session finish reporting part 301 transmits the input session finish reporting message to the session completion filtering canceling part 208 of the access control server, in a step S3011 of FIG. 27.

FIG. 26 shows the message structure of the session finish reporting message. The session finish reporting message includes the service server IP address which is the IP address of the service server 300, the service server port number which is the port number used in the session performed with the user, and the client IP address which is the IP address of the user with which the session is performed.

Figure 28:
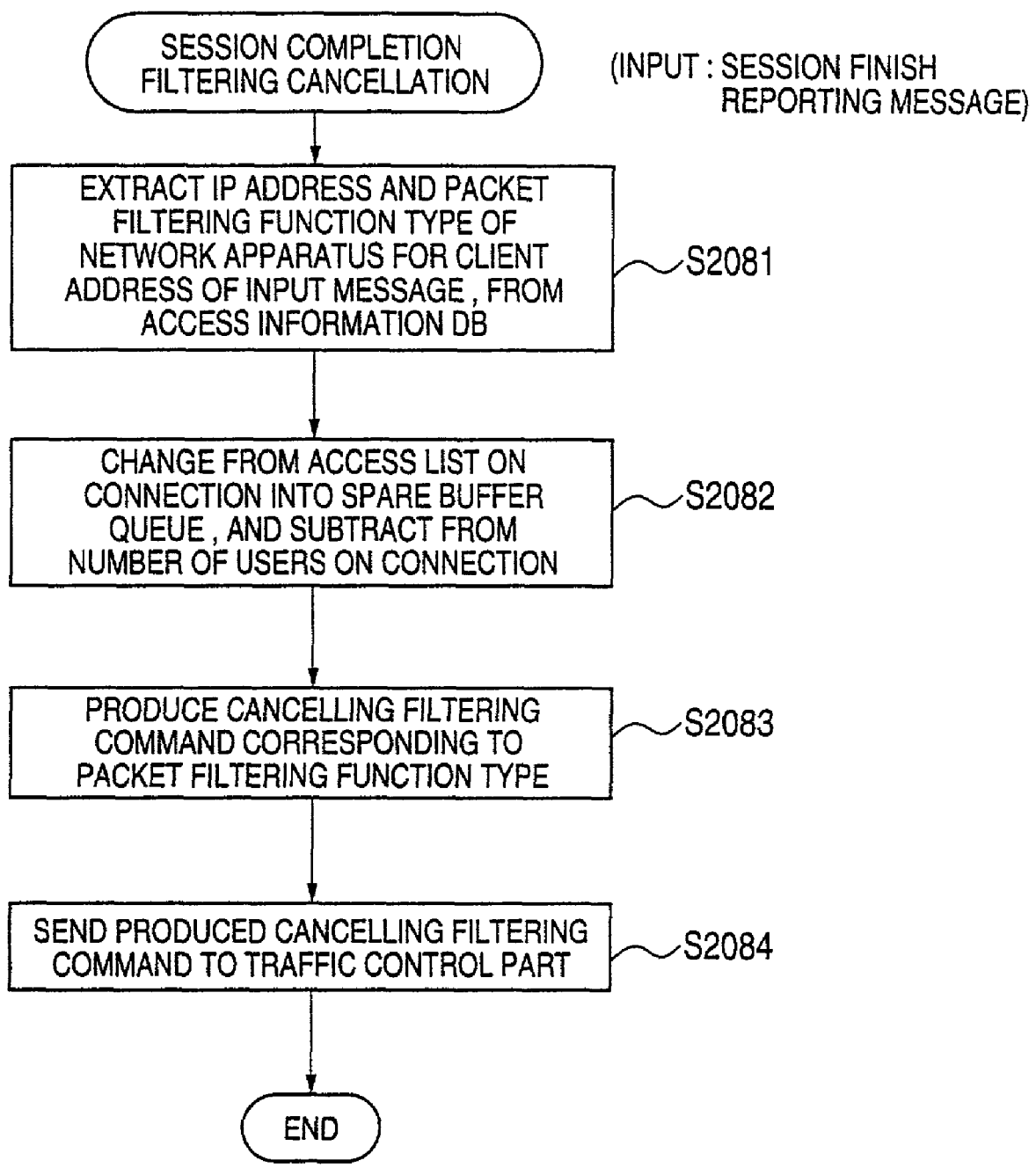
FIG. 28 shows a flow chart of processing performed by a session completion filtering canceling part shown in FIG. 1.

FIG. 28 shows a flow chart for illustrating processing performed by the session completion filtering canceling part 208. The session completion filtering canceling part 208 is in a state of waiting for reception of a message, by opening a communication port therefor, so as to receive the session finish reporting message. When the session finish reporting message is input thereto, the IP address and packet filtering function type of the network apparatus for the client IP address of the input session finish reporting message are extracted, from the assess information DB 209, in a step S2081. Then, in a step S2082, the assess-allowance-cancellation target buffer area for the IP address of the service server 300, service server port number and client server IP address is changed from the queue of the access list on connection of the access list 109 into the queue of the spare buffer, and, then, subtraction is made from the number of users on connection thereof accordingly.

Then, in a step S2083, the filtering command corresponding to the packet filtering function type for canceling the access allowance is produced. Then, in a step S2084, the produced canceling filtering command and the IP address of the network apparatus extracted in the step S2081 are set in the filtering command execution request shown in FIG. 22, and, then, control by the traffic control part 210 is performed. Thereby, as a result of the traffic control part 210 executing the filtering command canceling the access allowance, the user comes to not be able to access 'http://service. com' directly.

(5) User Reporting by Reception Proxy Server

The reception proxy server performs confirmation for waiting by the user and reporting of the estimated waiting time to the user, before performing processing of registering to the access list 109, when the result of determination as to whether the service server 300 is in the overload state is that it is in the overload state (in the step S1033 of FIG. 17).

Figure 29:
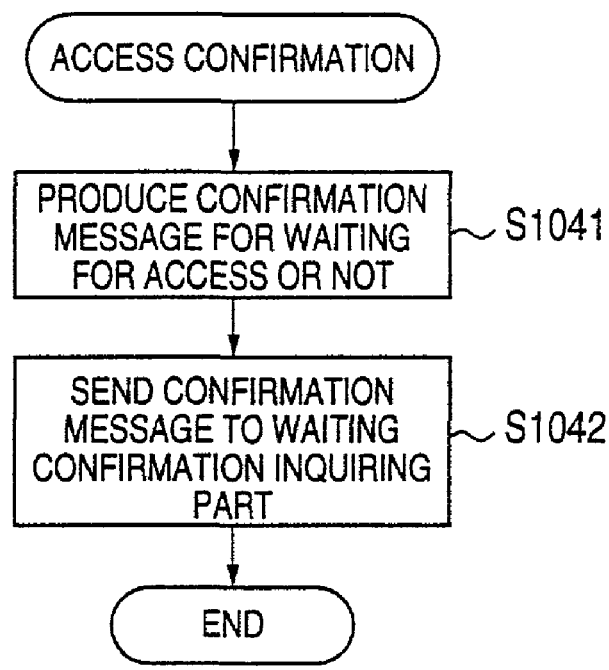
FIG. 29 shows a flow chart of processing performed by an access confirming part shown in FIG. 1.

First, confirmation made to the user for waiting will now be described. FIG. 29 shows a flow chart for illustrating processing performed by the access confirming part 104 in detail. The user transmits the access request for the service server 300 to the access receiving part 110 of the reception server 100 via the user terminal. The access receiving part 110 requests the registering part 103 to register the received access request to the access list 109. The access registering part 103 makes an access list registration confirmation in a case where a confirmation is made as to whether or not the access request information is to be registered in the access list 109 (in the case of overload: determined by the step S1033 of FIG. 17).

Figure 30:
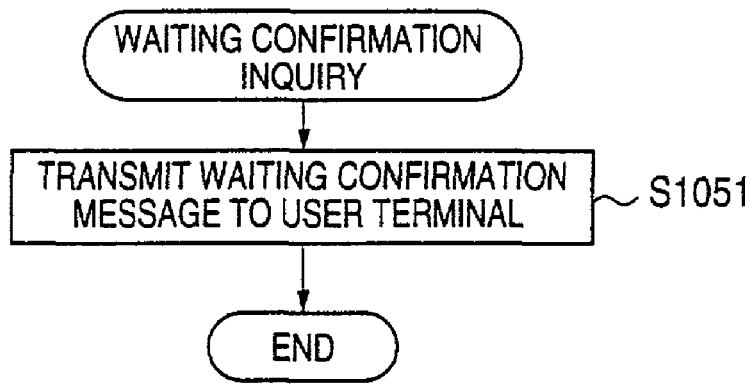
FIG. 30 shows a flow chart of processing performed by a waiting confirmation inquiring part shown in FIG. 1.

In a step S1041 of FIG. 29, the access confirming part 104 produces a confirmation message for making conformation as to whether or not the user will wait for the access. Then, in a step S1042, the produced message is sent to the waiting confirmation inquiring part 105. The waiting confirmation inquiring part 105 sends the confirmation message to the user via the HTTP protocol, in a step S1051 shown in FIG. 30. Then, the user transmits a response to the confirmation message to the access receiving part 110. The access receiving part 110 transmits the response from the user to the access registering part 103. When the response from the user indicates to perform registration (determined in the step S1031 of FIG. 17), the access registering part 109 registers the access request information to the access list 109.

Figure 31:
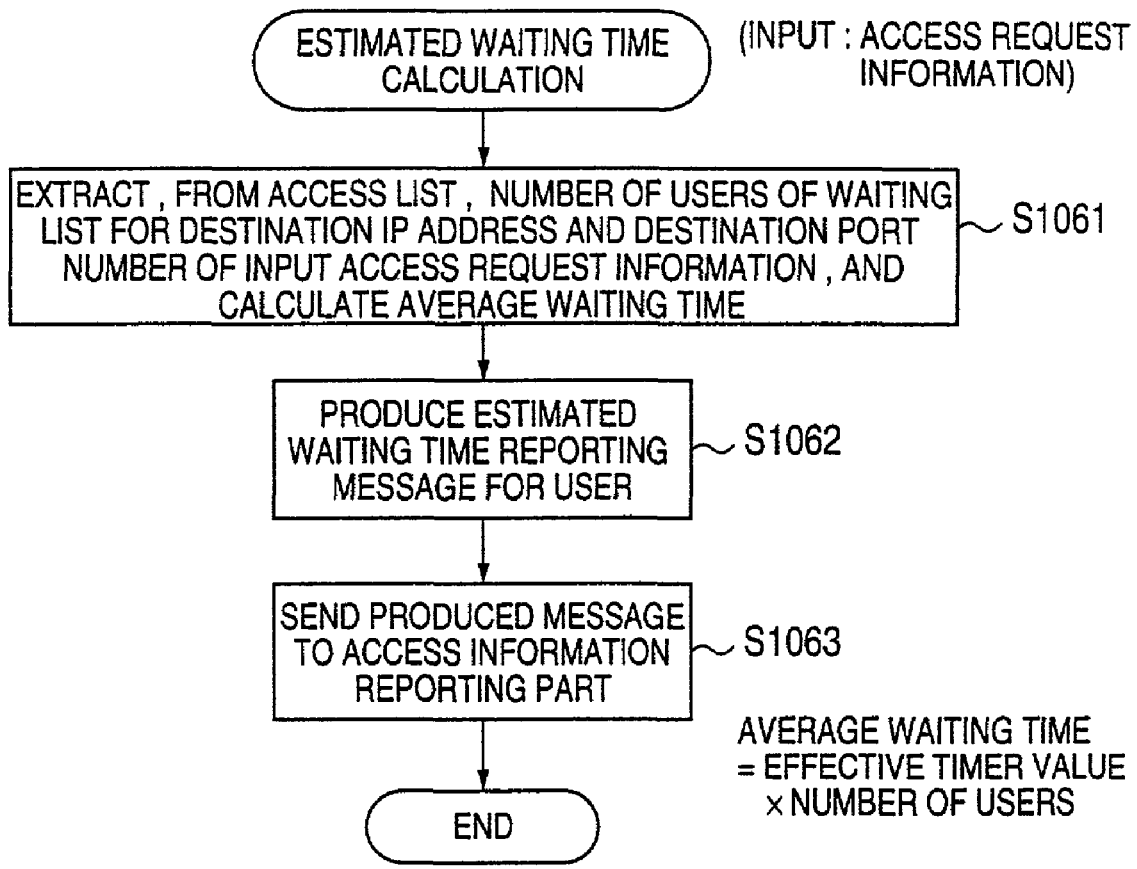
FIG. 31 shows a flow chart of processing performed by an estimated waiting time calculating part shown in FIG. 1.
Figure 32:
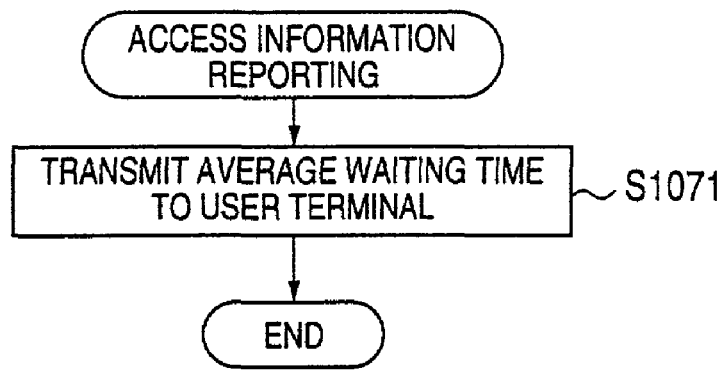
FIG. 32 shows a flow chart of processing performed by an access information reporting part shown in FIG. 1.

Processing of reporting the estimated waiting time will now be described. FIG. 31 shows a flow chart for illustrating processing performed by the estimated time calculating part 106 in detail. FIG. 32 shows a flow chart for illustrating processing performed by the access information reporting part 107 in detail. The user transmits the access request for the service server 300 to the access receiving part 110 of the reception server 100. The access receiving part 110 requests the access registering part 103 to register the received access request to the access list 109. In a case of overload where there is no spare access list in the access list 109 (determined in the step S1033 of FIG. 17), sends the estimated waiting time calculating request to the estimated waiting time calculating part 106.

In a step S1061 of FIG. 31, the estimated waiting time calculating part 106 extracts, from the access list 109, the number of users and effective timer value of the waiting access list for the destination IP address and destination port number of input access request information, then, calculates a waiting time by multiplying the effective timer value and the number of users together, and, in a step S1062, produces a message of reporting the thus-produced estimated waiting time. Then, the thus-produced message of reporting estimated waiting time is transferred to the access information reporting part 107, in a step S1063. The access information reporting part 107 reports the message reporting estimated waiting time to the user via the HTTP protocol, in a step S1071 of FIG. 32.

B. Optimum Access Service by Internet Service Provider

Further, not only by the static permissible access number calculating part 206 described with reference to FIG. 15 above, but also by the dynamic permissible access number calculating part 207 shown in FIG. 33, the maximum permissible access number is dynamically changed in consideration of the CPU used rate by the server and network used rate.

Figure 33:
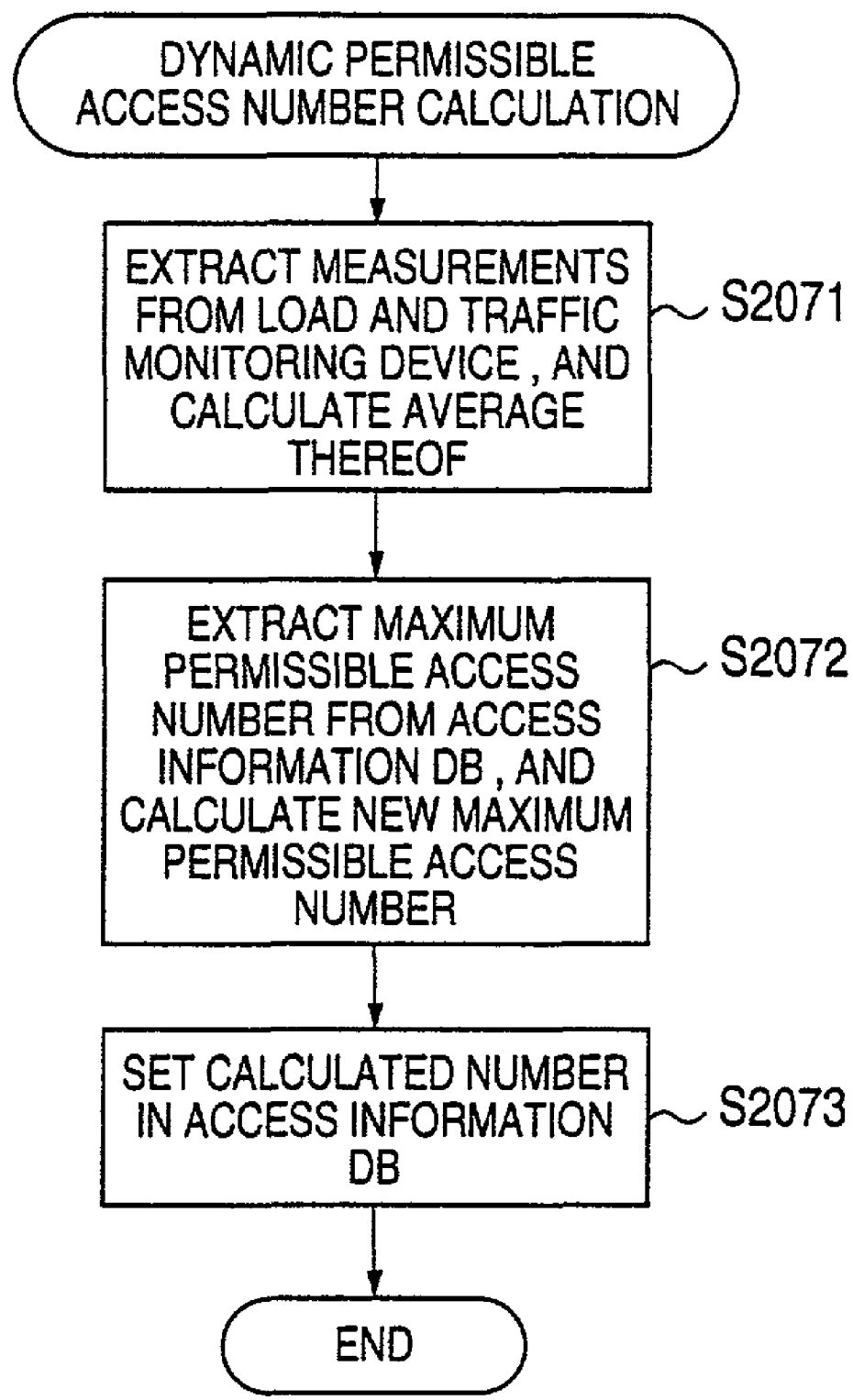
FIG. 33 shows a flow chart of processing performed by a dynamic permissible access number calculating part shown in FIG. 1.

FIG. 33 shows a flow chart for illustrating processing performed by the dynamic permissible access calculating part 207 in detail. Processing for the access allowance which can be rendered depending on the actual processing load and network traffic, by periodically extracting information of the load condition of the service server 300 and information of the traffic condition of the network apparatus holding the service server 300 by using the conventional load and traffic monitoring device 212, and appropriately changing the maxim permissible access number, will now be described.

In FIG. 33, in a step S2071, the dynamic permissible access number calculating part 207 periodically extracts, from the load and traffic monitoring device 212, information of the load condition of the service server 300 and information of the traffic condition of the network apparatus holding the service server 300, and calculates an average of the respective data. For example, when the CPU used rate is 80% and traffic amount is such that the used amount is 90% with respect to the server allowable traffic amount (wire speed), the average obtained therefrom is 85%.

In a step S2072, the maximum permissible access number currently used is extracted from the access information DB 209, and, the maximum permissible access number corresponding to the current CPU used rate and traffic amount is newly calculated. For example, updating is made only when the average calculated is more than 80%, and, when the average calculated in the step S2071 is 85%, the new maximum permissible access number is calculated by the following formula:

$$(\text{extracted maximum permissible access number}) \times [1 - (0.85 - 0.8)]$$

Then, in a step S2073, the thus-calculated maximum permissible access number is set into the access information DB 209.

C. Priority Control Service by Service Class by Internet Service Provider

The contractor of the service server 300 can select as to whether the service server 300 to be contacted performs the priority control by user class, when making the contract for the reception proxy service of the above-described item (1) of clause A. When the priority control is performed, the flag indicating that priority control is performed is set in the flag indicating whether or not the priority control is performed. Thereby, the user who is of the higher priority will be allowed to access the service server 300 earlier.

Figure 34:
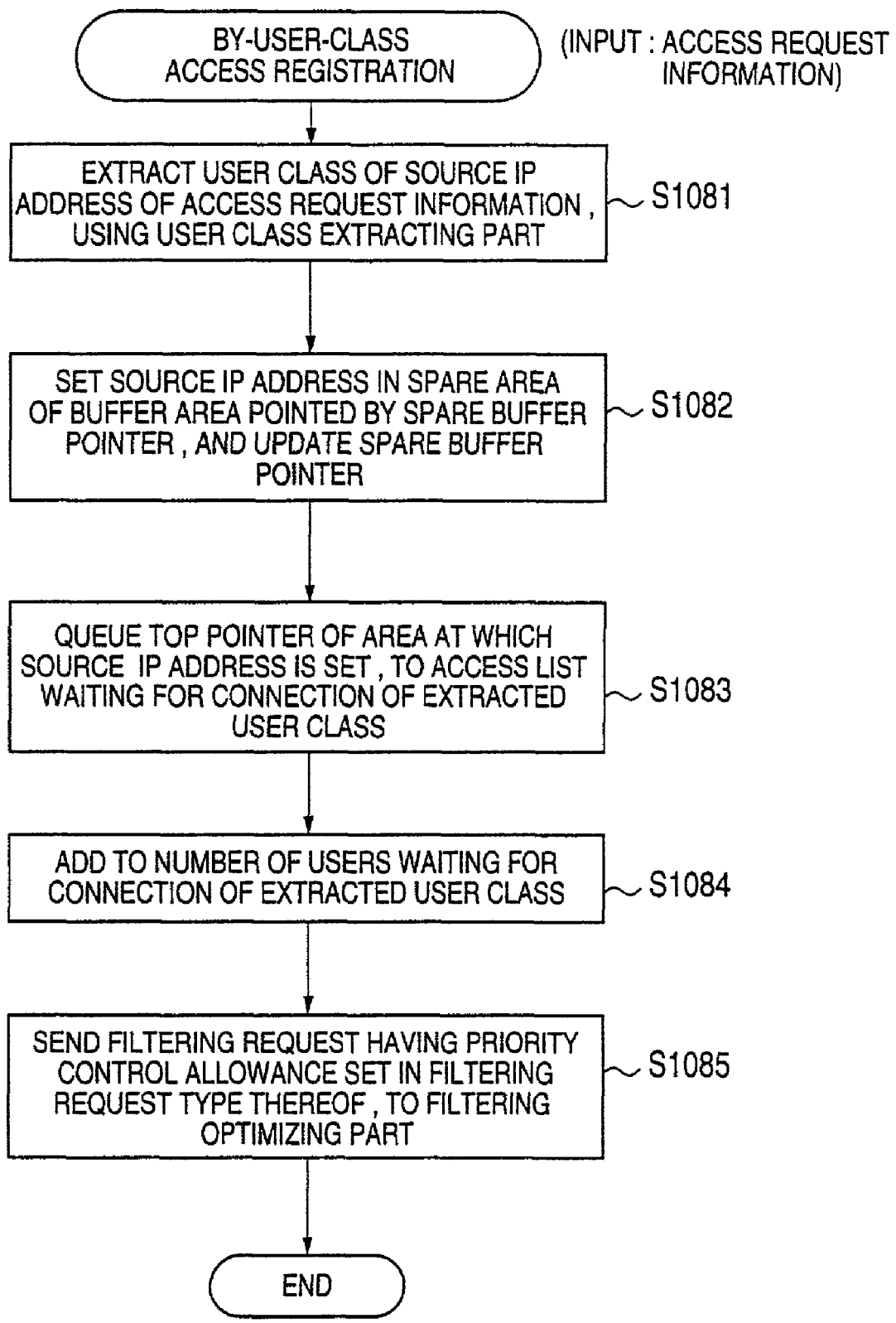
FIG. 34 shows a flow chart of processing performed by a by-user-class access registering part shown in FIG. 1.

The access registering part 103 described in the item (3) of the clause A above determines whether or not the service server 300 performs the priority control, and, when the priority control is performed, the by-user-class access registering part 108 registers the access request information to the access list 109 by user class as shown in FIG. 34.

Figure 35A:
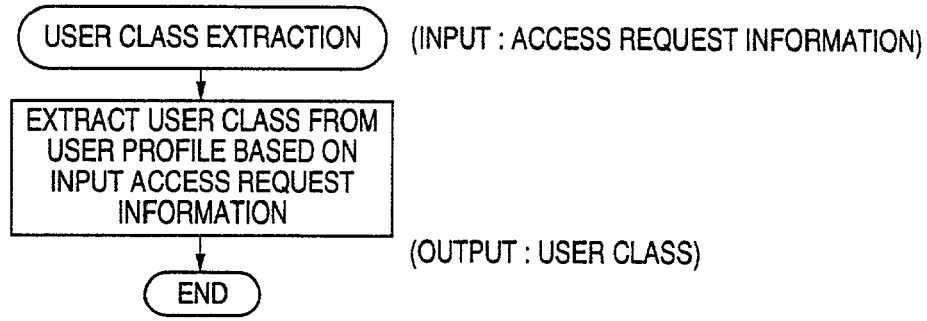
FIGS. 35A and 35B illustrate processing performed by a user-class extracting part shown in FIG. 1.
Figure 35B:
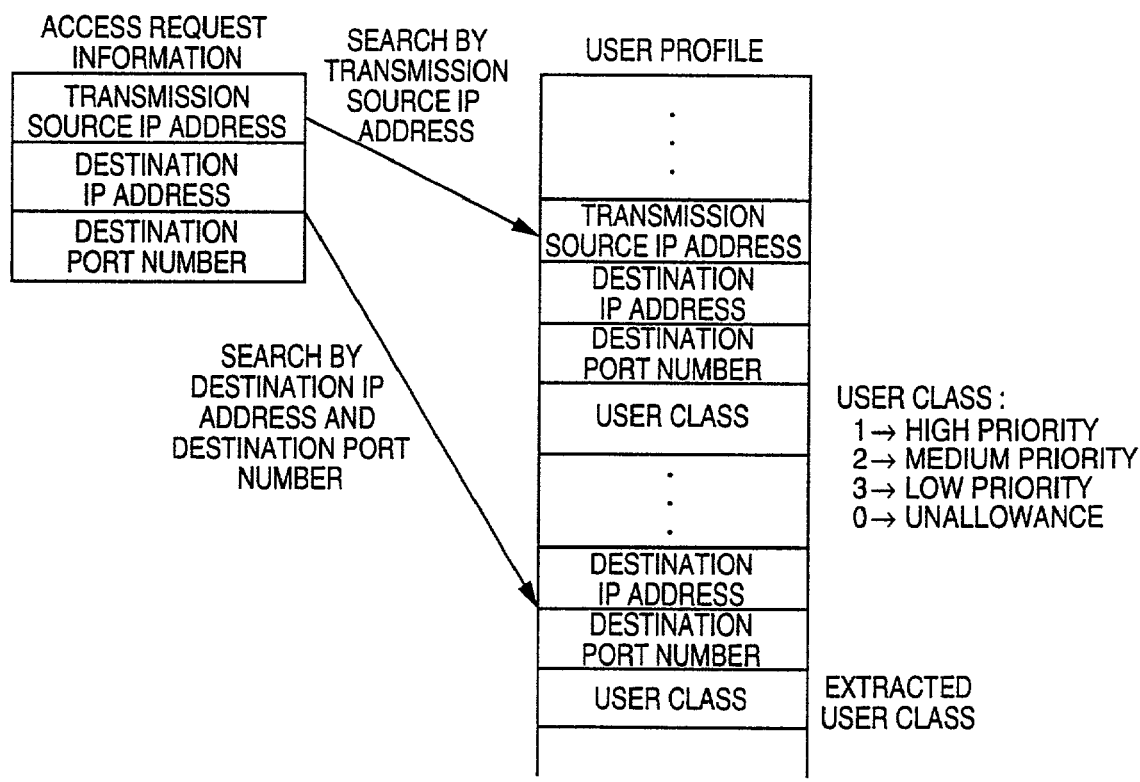

FIG. 34 shows a flow chart for illustrating processing performed by the by-user-class access registering part 108 in detail. In a step S1081, the by-user-class access registering part 108 extracts the user class by using the user class extracting part 102 performing processing shown in FIG. 35A, from the user profile 111. As shown in FIG. 35B, the transmission source IP address of the input access request information is specifically used for searching the user profile 111, and, thus, the user class is obtained therefrom.

Then, in a step S1082, the spare buffer queue is searched for from the buffer area, and the transmission source IP address is set in the buffer corresponding to the thus-obtained spare buffer queue, the spare buffer queue of the buffer area is updated, and, in a step S1083, the newly captured buffer is queued to the access area 109. Then, in a step S1084, addition is made to the number of users waiting for connection of the access list 109. With regard to control of the queuing, description is omitted as mentioned above. Then, in a step S1085, the priority control allowance request is set into the filtering request type of the filtering request shown in FIG. 19, and the other necessary information is set into the same by copying from the access request information. Then, the filtering optimizing part 204 performs control therefor.

Thereby, when reading such an amount of the access information from the access list 109 as that for the maximum permissible access number, the filtering optimizing part 204 determines the filtering request type of the thus-obtained filtering request (in a step S2041 of FIG. 20), and, when the filtering request type is the priority control allowance request, the filtering optimizing part 204 starts the by-user-class access request reading part 205 (in a step S20411 of FIG. 20). Then, the output IP address is set in the above-mentioned new access allowance list.

Figure 36:
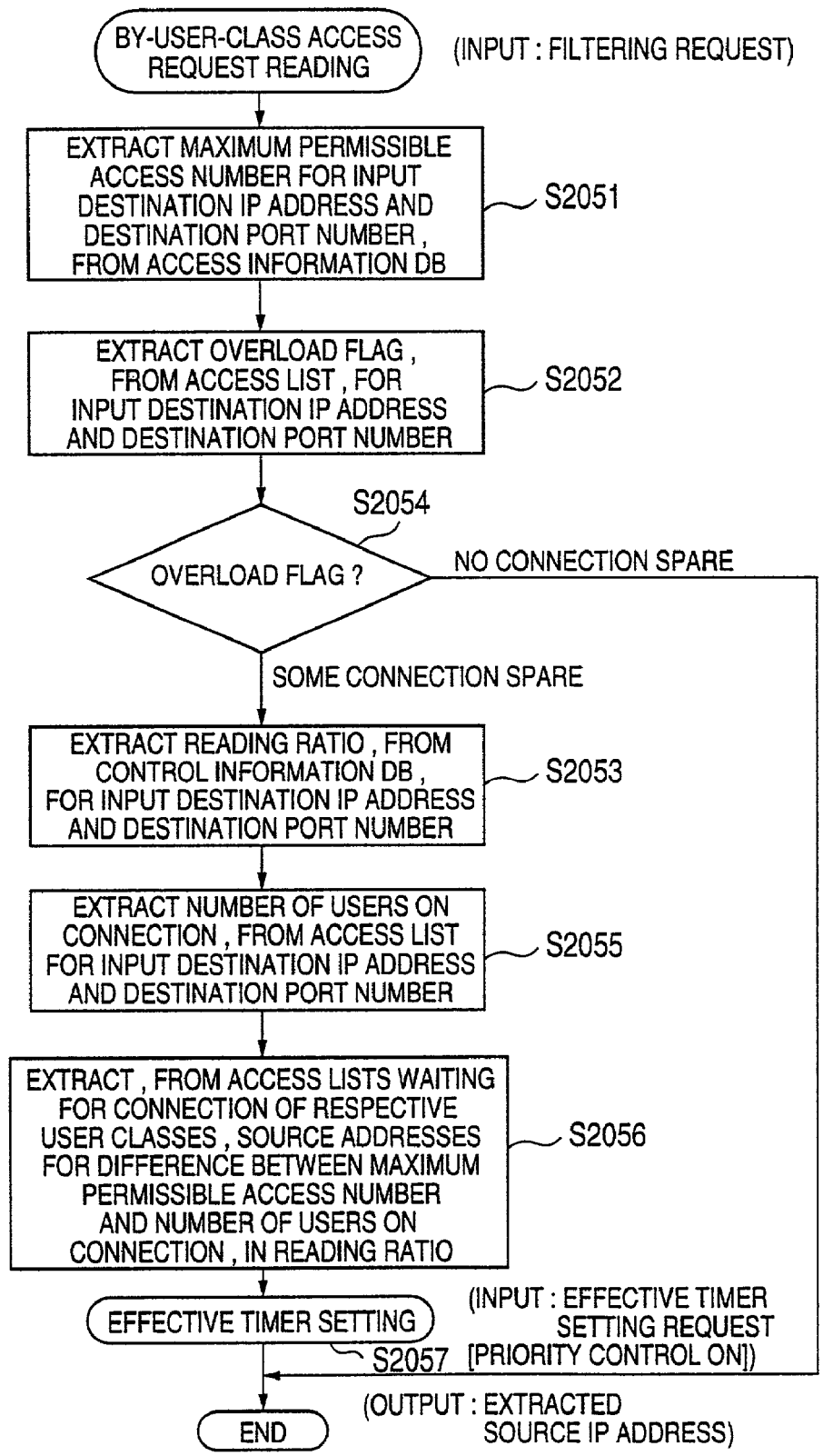
FIG. 36 shows a flow chart of processing performed by a by-user-class access request reading part shown in FIG. 1.

FIG. 36 shows a flow chart for illustrating processing performed by the by-user-class access request reading part 205 in detail. The by-user-class access request reading part 205 extracts, from the access information DB 209, the maximum permissible access number for the destination IP address and destination port number, in a step S2051. Then, in a step S2052, the overload flag is extracted from the access list 109. Then, in a step S2054, the overload flag is determined, and, when the overload indicates no connection spare, the current processing is finished. When some connection spare remains there, a step S2053 is performed.

In the step S2053, from the control information DB 211, the reading ratio for the destination IP address and destination port number of the input filtering request is extracted. For example, when the reading ratio is '3:2:1', the access request information is read from the high-priority list at a ratio of 1/2, from the medium-priority list at a ratio of 1/3 and from the low-priority list at a ratio of 1/6, from the access list 109.

Then, in a step S2055, the number of users on connection of each user class for the destination IP address and destination port number of the input filtering request is extracted. In a step S2056, the access request information is read from the access list 109 at the reading ratio extracted in the step S2057, and the effective timer setting part 203 is started. Then, the transmission source IP addresses of the thus-extracted access request information are returned by necessary information. Thus, the access request information is extracted from the access list 109 by user class.

FIG. 37 shows a message structure of the effective timer setting request. The effective timer setting request includes the request type indicating whether or nor the priority control is performed, the difference between the maximum permissible access number and the number of users on connection, the destination IP address which is the IP address of the service server 300, and the destination port number which is the port number of the target application used for communication between the service server 300 and user. The difference between the maximum permissible access number and the number of users on connection is single data when the priority control is not performed. However, when the priority control is performed, the difference between the maximum permissible access number and the number of users on connection is set for each user class. For example, in a case of the high priority, medium priority and low priority, three sets of the data are set.

D. Nonallowance User Regulation Service by Internet Service Provider

As described in the item (1) of clause A above, the service provider issues the URL such as 'http://service. request. com' for the service server 300 which provides services, to the site. Then, the site which has had the URL issued publishes this URL to general users together with the effective period (contract period of the reception proxy service).

It is possible that, according to the service contract made with the users before the publishing, registration is made in the server providing the services such that only accesses from these users are allowed, and any accesses from the other users are not allowed. In such a case, instead of the service server 300, the reception proxy center performs user authentication, and, thereby, access from any unallowed user is prevented previously. Thereby, no extra load is applied to the service server 300.

When the access request is sent to the service server 300 from the user terminal, the access receiving part 110 sends the access request information to the user authenticating part 101.

Figure 38:
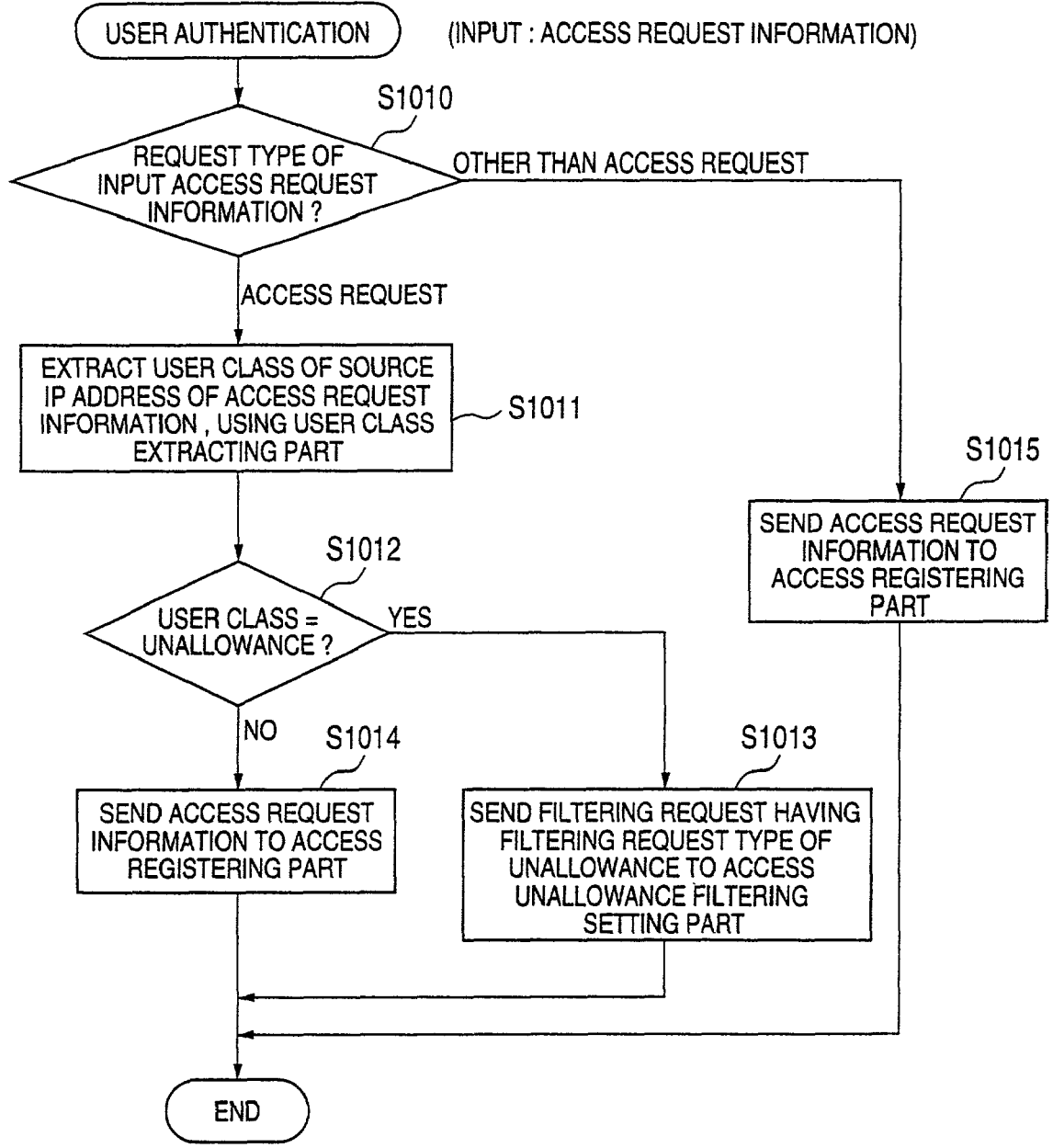
FIG. 38 shows a flow chart of processing performed by a user authenticating part shown in FIG. 1.

FIG. 38 shows a flow chart for illustrating processing performed by the user authenticating part 101 in detail. Further, FIG. 39 shows a flow chart for illustrating processing performed by the access unallowance filtering setting part 201 in detail.

The user authenticating part 101 determines the request type of the input access request information in a step S1010 of FIG. 38. When the request type is the access request, a step S1011 is performed. When it is not the access request, a step S1015 is performed, and, the access request information is transferred to the access registering part 103.

In a step S1011, the user class of the transmission source IP address of the access request information is extracted from the user profile 111 through the user class extracting part 102. Then, in a step S1012, the extracted user class is determined, and, when the determination result is access unallowance, a step S1013 is performed, and the filtering request having the filtering request type made to be unallowance is sent to the access unallowance filtering setting part 201. When it is access allowance, a step S1014 is performed, and, the access request information is sent to the access registering part 103.

In FIG. 39, the access unallowance filtering setting part 201 extracts, from the access information DB 209, the IP address and packet filtering function type of the network apparatus for the destination IP address of the thus-input filtering request, in a step S2011. Then, in a step S2012, the unallowance filtering command corresponding to the packet filtering function type is produced. In a step S2013, the produced unallowance filtering command and the IP address of the network apparatus extracted in the step S2011 are set in the filtering command execution request shown in FIG. 22, and, then, control by the traffic control part 210 is performed therefor. As a result of the traffic control part 210 executing the unallowance filtering command, the user comes to not be able to access 'http://service. com' directly.

According to the present invention, the number of users, for which processing can be properly performed by the service server 300, can directly access the service server 300, in order that the capability of the server can be effectively utilized, at any time. Accordingly, the problem in that contents are not updated occurring when the cache function of the proxy server is used, and the problem in that the dynamic object having the contents thereof varying each time of access cannot be re-used, are eliminated. Also, because no useless traffic flows through the network 10, it is possible to reduce the traffic. Further, by reducing the traffic, it is possible to effectively utilize the network resources.

According to the present invention, waiting by users for access requests is enabled. Accordingly, loads-applied to the users can be reduced in comparison to a case where the number of connections is set in the service server 300. Further, according to the present invention, the load condition of the service server 300 and traffic condition are periodically monitored. Thereby, it is possible to recognize the processing capability of the service server 300 to which connection is made, and, thereby, it is possible for the service server 300 to allow access thereto by the number of users for which the service server 300 can operate in the optimum operation condition.

Further, in the related arts, when the user accesses the service server which is in an overload condition, the response speed becomes low, and/or a message is sent to the user such as to deny a response after the user waits for the response for a very long time. However, according to the present invention, because the waiting by the user is possible as mentioned above, the user who has given the access request can receive the service when the own turn comes, conveniently, with a short response time.

Further, it is also possible to select an operation manner in which, the access control according to the present invention is rendered while connection requests are congested so that the access control of the present invention is useful, and the conventional normal connection control is performed while no such congestion is occurring. Thereby, it is possible to secure the best connection condition at any time.

The present invention is not limited to the above-described embodiments, and variations and modifications may be made without departing from the scope of the present invention.

The present application is based on Japanese priority application No. 2000-331345, filed on Oct. 30, 2000, the entire contents of which are hereby incorporated by reference.

What is claimed is:

1. A network access control method for a network system comprising:
   network apparatuses having packet filtering functions;
   a service server connected with an IP network via the network apparatus, providing contents on the service server to a user;
   a user terminal connected with the IP network via the network apparatus, for the user to utilize the contents on the service server;
   a reception server connected with the IP network via the network apparatus, receiving an access request to the contents on the service server from the user on behalf of the service server; and
   an access control server controlling the network apparatus for a limitation of the access request to the contents on the service server,
   said method comprising the steps of:
   a) said access control server first denying all the access requests directed to the contents on the service server via the network apparatus;
   b) said reception server receiving access request information to the contents on the service server from said user terminals, and registering the received access request information in an access list; and
   c) said access control server extracting such an amount of the received access request information from said access list, based on a processing capability of the service server and a traffic amount for the service server, as that said service server can optimally deal with, and performing traffic control to the network apparatus connected with the user terminals so as to allow the user terminals to directly access the contents on the service server in the other of access requests,
   wherein said access control server comprises:
   an access information database holding information concerning the processing capability of the service server and a maximum permissible access number calculated based on the processing capability of the service server;
   a traffic control part controlling the network apparatus;
   a static permissible access number calculating part calculating the maximum permissible access number based on the information concerning the processing capability of the service server;
   a filtering optimizing part reading such an amount of the access request information from the access list holding the access request information from the user terminals in the reception server, from the top, as that for the maximum permissible access number, producing packet filtering setting information for the users making access requests to be able to access to the service server, and setting the produced information in the network apparatus via said traffic control part;
   an effective timer setting part setting an effective timer for the access request information when the packet filtering setting information is produced; and
   a filtering canceling part canceling the packet filtering control set in the network apparatus, when the effective timer has expired.

2. A network system comprising:
   network apparatuses having packet filtering function;
   a service server connected with an IP network via the network apparatus, providing contents on the service server to a user;
   a user terminal connected with the IP network via the network apparatus, for the user to utilize the contents on the service server;
   a reception server connected with the IP network via the network apparatus, receiving an access request to the contents on the service server from the user on behalf of the service server; and
   an access control server controlling the network apparatus for a limitation of the access request to the contents on the service server, wherein:
   said access control server first denies all the access requests directed to the contents on the service server via the network apparatus;
   said reception server receives access request information to the contents on the service server from said user terminals, and registers the received access request information in an access list;
   said access control server extracts such an amount of the received access request information from said access list, based on a processing capability of the service server and a traffic amount for the service server, as that said service server can optimally deal with, and performs traffic control to the network apparatus connected with the user terminals so as to allow the user terminals to directly access the contents on the service server in the other of access requests; and
   said access control server comprises:
   an access information database holding information concerning the processing capability of the service server and a maximum permissible access number calculated based on the processing capability of the service server;
   a traffic control part controlling the network apparatus;
   a static permissible access number calculating part calculating the maximum permissible access number based on the information concerning the processing capability of the service server;
   a filtering optimizing part reading such an amount of the access request information from the access list holding the access request information from the user terminals in the reception server, from the top, as that for the maximum permissible access number, producing packet filtering setting information for the users making access requests to be able to access to the service server, and setting the produced information in the network apparatus via said traffic control part;
   an effective timer setting part setting an effective timer for the access request information when the packet filtering setting information is produced; and
   a filtering canceling part canceling the packet filtering control set in the network apparatus, when the effective timer has expired.

3. A server apparatus applicable as said reception server of said network system claimed in claim 2, comprising:
   a user profile holding the user information including a user class for each user;
   an access receiving part receiving the access request to the contents on the service server from the user on behalf of the service server;
   an access registering part registering the access request information received via said access receiving part into said access list in order of the reception;
   a user class extracting part extracting an IP address from the received access request information, and identifying the user by using the extracted IP address so as to extract the user class from said user profile; and a by-user-class registering part registering the access request information received via said access receiving part into said access list based on the user class extracted through said user class extracting part.

4. The reception server as claimed in claim 3, further comprising:

an estimated waiting time calculating part calculating an estimated waiting time, from the number of the users waiting, according to a position of said access list at which the access request received from the user terminal is registered; and an access information reporting part reporting the calculated estimated waiting time to the user, and reporting to the user that the access can be performed after the estimated waiting time has elapsed.

5. The reception server as claimed in claim 3, further comprising:

an access confirming part determining whether or not the access request is to be registered in said access list, when waiting is needed, after receiving the access request from the user terminal; and a waiting confirmation inquiring part inquiring to the user for said access confirming part to make the determination.

6. The access control server as claimed in claim 2, further comprising:

a load and traffic monitoring part monitoring a load condition of the service server and a traffic condition of a network apparatus holding the service server; and a dynamic permissible access number calculating part periodically performing communication with said load and traffic monitoring part so as to extract therefrom information of the load condition and traffic condition, and calculate the maximum permissible access number therefrom, and, also, registering the calculated maximum permissible access number in the access information database.

7. The access control server as claimed in claim 2, further comprising:

a control information database holding control information which is used as a guideline for reading the access request information from the access list; and a by-user-class access request reading part reading the access request information from the access list for each user class based on the control information extracted from said control information database, when the filtering optimizing part reads such an amount of the access request information from the access list as that for the maximum permissible access number, in a case where the access request information is registered in the access list by user class.

8. A server apparatus applicable as said service server of said network system claimed in claim 2, comprising:

a session finish determining part determining that a session performed with the user terminal has finished; and a session finish reporting part reporting to the access control server that the session performed with the user terminal has finished.

9. The reception server as claimed in claim 3, further comprising a user authenticating part determining, based on the user class extracted through the user class extracting part, whether or not the received access request is given from an unallowed user, and, reporting, when the access request is given from the unallowed user, this matter to the access control server.

10. The access control server as claimed in claim 2, further comprising an access unallowance filtering setting part producing, based on a report from the user authenticating part of the reception server, the packet filtering setting information of access unallowance for the service server, and setting the produced information in the network apparatus.

* * * * *